US008688112B2

(12) United States Patent
Shen et al.

(10) Patent No.: US 8,688,112 B2
(45) Date of Patent: Apr. 1, 2014

(54) NEIGHBORING CELL SEARCH FOR MOBILE COMMUNICATION SYSTEMS

(75) Inventors: Yuan Shen, Cambridge, MA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 12/557,490

(22) Filed: Sep. 10, 2009

(65) Prior Publication Data

US 2010/0069066 A1 Mar. 18, 2010

Related U.S. Application Data

(60) Provisional application No. 61/096,585, filed on Sep. 12, 2008.

(51) Int. Cl.
| | |
|---|---|
| *H04W 4/00* | (2009.01) |
| *H04J 3/06* | (2006.01) |
| *H04J 11/00* | (2006.01) |
| *H04W 40/00* | (2009.01) |
| *H04W 48/16* | (2009.01) |
| *H04L 27/26* | (2006.01) |
| *H04L 5/00* | (2006.01) |

(52) U.S. Cl.
CPC ........... *H04J 11/0069* (2013.01); *H04W 48/16* (2013.01); *H04L 27/2613* (2013.01); *H04L 5/0007* (2013.01); *H04L 5/0048* (2013.01)
USPC ..... 455/434; 455/447; 455/435.3; 455/435.2; 370/350; 370/329; 370/509; 370/208

(58) Field of Classification Search
USPC ............ 455/434, 447, 435.3, 435.2; 370/350, 370/329, 509, 208
See application file for complete search history.

(56) References Cited

U.S. PATENT DOCUMENTS

| | | | | |
|---|---|---|---|---|
| 7,532,590 | B2 * | 5/2009 | Ok et al. ........................ | 370/310 |
| 7,715,850 | B2 | 5/2010 | Lin | |
| 7,796,563 | B2 | 9/2010 | Wu et al. | |
| 2005/0265293 | A1 * | 12/2005 | Ro et al. ........................ | 370/335 |

(Continued)

FOREIGN PATENT DOCUMENTS

| | | |
|---|---|---|
| EP | 1292168 A2 | 3/2003 |
| FR | 2872979 | 1/2006 |

(Continued)

OTHER PUBLICATIONS

Neighboring Cell Search Techniques for LTE Systems; Authors:Yuan Shen; Tao Luo ; Win, M.Z. Published: May 2010.*

(Continued)

*Primary Examiner* — Dwayne Bost
*Assistant Examiner* — Nalini Mummalaneni
(74) *Attorney, Agent, or Firm* — Dalei Dong

(57) ABSTRACT

Systems and methodologies are described that effectuate or facilitate detecting a cell (serving or neighboring cell) in multichannel wireless communication environments. In accordance with various aspects set forth herein, systems and/or methods are provided that receive signals from multiple cells and identify candidate cells based at least in part on the received signals, compare signal metrics for each of the candidate cells, select signal metrics associated with each of the candidate cells, and compare signal metrics to identify proximate base stations located within a candidate cell.

10 Claims, 16 Drawing Sheets

(56) References Cited

U.S. PATENT DOCUMENTS

| | | | |
|---|---|---|---|
| 2006/0039451 A1* | 2/2006 | Zhuang et al. | 375/145 |
| 2006/0227745 A1* | 10/2006 | Olvera-Hernandez et al. | 370/331 |
| 2008/0046979 A1 | 2/2008 | Oulahal | |
| 2008/0080439 A1* | 4/2008 | Aziz et al. | 370/338 |
| 2008/0316911 A1* | 12/2008 | Wilhelmsson et al. | 370/210 |

FOREIGN PATENT DOCUMENTS

| | | |
|---|---|---|
| WO | WO2008033985 | 3/2008 |
| WO | WO 2008033985 A2 * | 3/2008 |
| WO | WO2008086491 | 7/2008 |
| WO | WO 2008086491 A1 * | 7/2008 |

OTHER PUBLICATIONS

A Robust Cell Search Algorithm for 3GPP LTE Bengt Lindoff, Tobias Ryd'en, David Astely Published: May 2009.*

International Search Report and Written Opinion—PCT/US2009/056735, International Search Authority—European Patent Office—Nov. 23, 2010.

Taiwan Search Report—TW098130936—TIPO—Feb. 26, 2013.

* cited by examiner

NEIGHBORING CELL SEARCH FOR MOBILE COMMUNICATION SYSTEMS

CLAIM OF PRIORITY UNDER 35 U.S.C. §119

The present Application for patent claims priority to Provisional Application No. 61/096,585, entitled "NEIGHBORING CELL SEARCH METHODS AND SYSTEMS FOR MOBILE COMMUNICATION SYSTEMS", filed Sep. 12, 2008, which is assigned to the assignee hereof and hereby expressly incorporated by reference herein.

BACKGROUND

I. Field

The following description relates generally to wireless communications, and more particularly to searching and/or tracking of neighboring cells for handover or other applications, such as, location inference and/or cooperative transmission from base stations.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ...). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), 3GPP Long Term Evolution (LTE) systems, and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \le \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Access terminals or user equipment (UE) wishing to access a long term evolution (LTE) cell typically must first undertake a cell search procedure. This can consist of a series of synchronization stages by which the UE determines time and frequency parameters necessary to modulate downlink and transmit uplink signals with the correct timing. At this stage, the access terminal or UE also acquires some critical system parameters.

Three major synchronization requirements can be identified in the LTE™ system: the first is symbol timing acquisition, by which the correct symbol start position is determined, for example, to set the Fast Fourier Transform (FFT) window position; the second is carrier frequency synchronization, which is typically required to reduce or eliminate the effect of frequency errors arising from a mismatch of local oscillators between transmitter and receiver, as well as the Doppler shift that can be caused by any UE motion; thirdly, sampling clock synchronization can also be necessary.

Two relevant cell search procedures exist in LTE™: initial synchronization whereby the access terminal or UE detects a LTE™ cell and decodes all the information required to register it—typically performed for example, when the UE is switched on, or when the UE has lost connection to its serving cell; and new cell identification, generally performed when the UE is already connected to an LTE™ cell and is in the process of detecting a new neighbor cell.

In both scenarios, the synchronization procedure can utilize physical signals broadcast in each cell: the primary synchronization channel (PSC) and the secondary synchronization channel (SSC). Detection of these two signals not only enables time and frequency synchronization, but also provides the access terminal or UE with the physical layer identity of the serving cell and the cyclic prefix (CP) length, and further informs the access terminal or UE whether the cell employs frequency division duplex (FDD) or time division duplex (TDD).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with various aspects of the subject disclosure a method is provided that effectuates detecting a cell k in a multichannel wireless communication environment. The method includes receiving signals from a plurality of cells, identifying candidate cells k based at least in part on the received signals, comparing signal metrics for each of the candidate cells k, selecting the signal metrics associated with each of the candidate cells k, and comparing corresponding signal metrics associated with each of the candidate cells k in order to identify a base station situated within one of the candidate cells k.

In accordance with a further aspect of the subject disclosure, a wireless communications apparatus is disclosed wherein the wireless communications apparatus comprises a memory that retains instructions related to: receiving signals from a plurality of cells wherein the signals from the plurality of cells include secondary synchronization channel (SSC) sequences, identifying candidate cells k based at least in part on the received signals, comparing signal metrics for each of the candidate cells k, selecting the signal metrics associated with each of the candidate cells k, and comparing corresponding signal metrics associated with each of the candidate cells k in order to identify a base station situated within one of the candidate cells k. Additionally, the wireless communications apparatus also includes a processor, coupled to the memory that is configured to execute the instructions retained in the memory.

In accordance with yet a further aspect of the subject disclosure, a wireless communications apparatus that effectuates detection of a cell in a wireless communication environment is provided wherein the wireless communications apparatus comprises means for receiving signals from multiple cells and identifying candidate cells based at least in part on the received signals, means for comparing signal metrics for each of the candidate cells, means for selecting signal metrics associated with each of the candidate cells, and means for comparing signal metrics to identify a proximate base station located within one candidate cell.

In accordance with a further embodiment of the subject disclosure a computer program product is disclosed. The computer program product includes computer-readable medium comprising: code for receiving signals from multiple cells and identifying candidate cells based at least in part on the received signals, code for comparing signal metrics for each of the candidate cells, code for selecting signal metrics associated with each of the candidate cells, and code for comparing signal metrics to identify a proximate base station located within one candidate cell.

In accordance with further embodiments of the subject disclosure a wireless communications apparatus is disclosed wherein the wireless communications apparatus includes a processor configured to receive signals from multiple cells and identifying candidate cells based at least in part on the received signals, compare signal metrics for each of the candidate cells, select signal metrics associated with each of the candidate cells, and compare signal metrics to identify a proximate base station located within one candidate cell.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
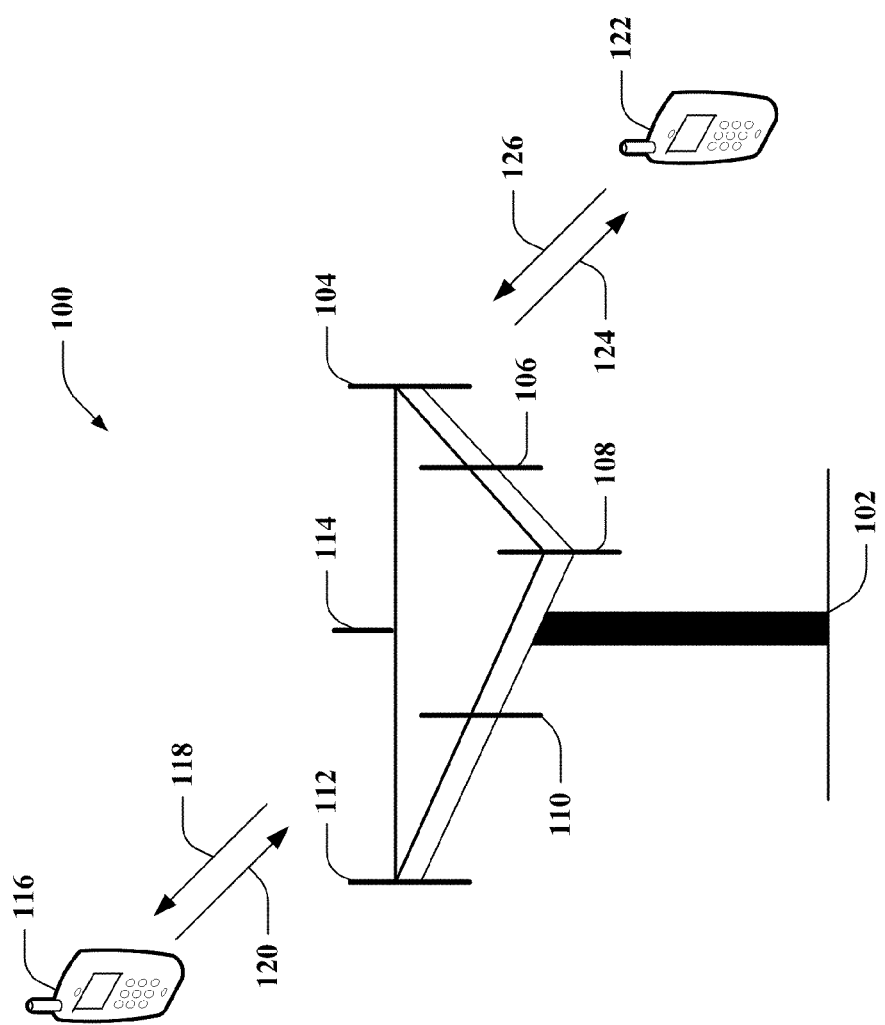
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000™, etc. UTRA includes Wideband-CDMA (W-CDMA) and other variants of CDMA. CDMA2000™ covers IS-2000, IS-95 and IS-856 standards. A TDMA system can implement a radio technology such as Global System for Mobile Communications (GSM™). An OFDMA system can implement a radio technology such as Evolved UTRA (E-UTRA), Ultra Mobile Broadband (UMB), IEEE™ 802.11 (Wi-Fi™), IEEE™ 802.16 (WiMAX™), IEEE™ 802.20, Flash-OFDM, etc. UTRA and E-UTRA are part of Universal Mobile Telecommunication System (UMTS). 3GPP™ Long Term Evolution (LTE™) is an upcoming release of UMTS that uses E-UTRA, which employs OFDMA on the downlink and SC-FDMA on the uplink.

SC-FDMA utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP™ Long Term Evolution (LTE™) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage area, access terminals in neighboring cells can be subject to less interference as compared to a base station transmitting through a single antenna to all its access terminals.

Figure 2:
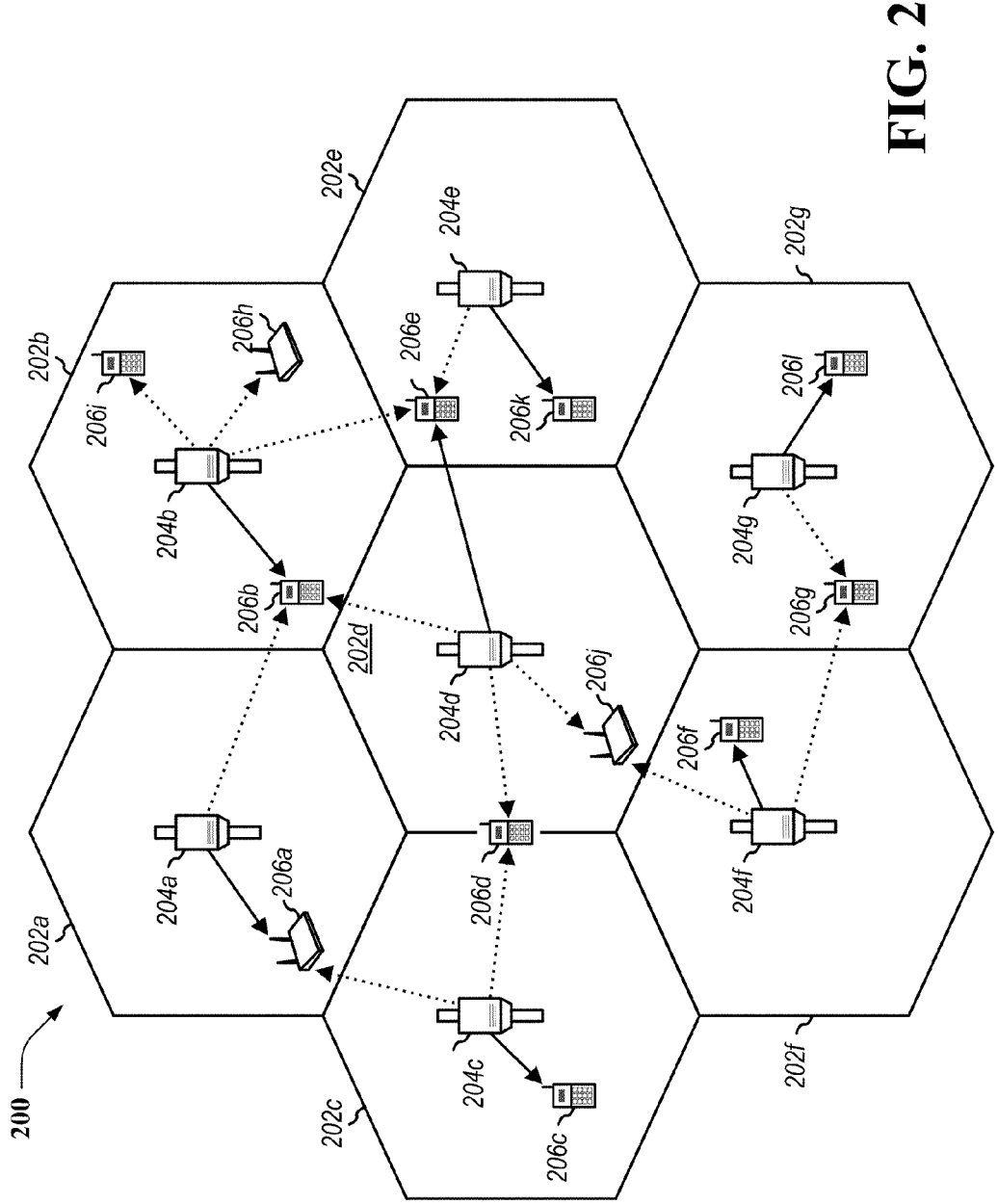
FIG. 2 provides illustration of a further wireless communication system configured to support a number of users, in which various disclosed embodiments and aspects can be implemented.

FIG. 2 provides illustration of a further wireless communication system 200 configured to support a number of users, in which various disclosed embodiments and aspects may be implemented. As shown in FIG. 2, by way of example, system 200 provides communication for multiple cells 202, such as, for example, macro cells 202a-202g, with each cell being serviced by a corresponding access point (AP) 204 (such as APs 204a-204g). Each cell may be further divided into one or more sectors. Various access terminals (ATs) 206, including ATs 206a-206k, also known interchangeably as user equipment (UE) or mobile stations, are dispersed throughout the system. Each AT 206 may communicate with one or more APs 204 on a forward link (FL) and/or a reverse link (RL) at a given moment, depending upon whether the AT is active and whether it is in soft handoff, for example. The wireless communication system 200 may provide service over a large geographic region, for example, macro cells 202a-202g may cover a few blocks in a neighborhood.

Long term evolution (LTE) is a part of evolved UMTS beyond HSPA and the air interface can differ from WCDMA in three major respects—the downlink waveform is typically based on orthogonal frequency division multiplexing (OFDM), the system supports a variable system bandwidth ranging from 1.25 MHz to 20 MHz, and there generally is a maximum commonality between FDD and TDD designs of LTE. In LTE systems, the cell ID identification can be uniquely determined by the primary synchronization channel (PSC) and secondary synchronization channel (SSC) symbols. These symbols are typically transmitted repeatedly every 5 ms (see FIG. 5). In accordance with the current LTE standard, each PSC symbol can be one of length-62 Zadoff-Chu (ZC) sequences (also known as Generalized Chirp-Like (GCL) sequences) which are mainly employed for synchronization, but which can also provide the cell group ID $N_{ID}^{(2)}$=0,1,2. The SSC symbols are typically two interleaved scrambled length-31 maximum length sequences (M-length sequences) padded with zeros at the beginning and the middle. Generally there can be 504 different or distinct SSC sequences in LTE systems. Accordingly, the SSC sequence for the kth cell can be represented as:

$$s_k = [0 p_1[1] p_2[1] \ldots p_1[16] 0 p_2[16] \ldots p_1[31] p_2[31]]^T$$

where $p_1 = \tilde{s}(m_0) \otimes \tilde{c}(N_{ID}^{(2)})$ and $p_2 = \tilde{s}(m_1) \otimes \tilde{c}(N_{ID}^{(2)}+3) \otimes \tilde{z}(m_1)$, in which $\tilde{s}(m)$, $\tilde{c}(m)$, and $\tilde{z}$ denote the mth shift of the corresponding length-31 M-sequences, respectively, defined in the LTE standard. The parameter set $m_0$, $m_1$, and $N_{ID}^{(2)}$ is uniquely determined by the cell ID k.

Neighboring cell search (NCS) can refer generally to detecting multiple cell IDs from the SSC symbol in a received signal. Due to the strong side lobes of the cross-correlation property of the SSC codes (See FIG. 12) it typically is not prudent to directly select the peaks of the cross-correlation outputs without interference cancellation. While this appears to be analogous to multiuser detection (MUD) in uplink CDMA, the NCS problem differs due at least to the following differences, as set forth in the table below, as compared to MUD:

| NCS in LTE | MUD |
| --- | --- |
| Unknown set of neighbor cells; aim to detect the set of cells | Known set of users; aim to decode the transmitted data |
| No power control | Power control from users |
| Two interleaved scrambled M-sequence | M-sequence for signature |
| OFDMA | CDMA |

Moreover, as an additional prelude to the more detailed description of the various embodiments and/or aspects set forth below, it should be appreciated without limitation or loss of generality that for the purposes of exposition a received signal in a multipath channel in the frequency domain can be represented as:

$$r = \sum_{k \in \psi} \sum_{l=1}^{L_k} \alpha_k^{(l)} \cdot G(\tau_k^{(l)}) \cdot s_k + z,$$

where $s_k$ is the secondary synchronization channel (SSC) sequence for cell k, $L_k$ is the multipath number for cell k, $\alpha_k^{(l)}$ and $\tau_k^{(l)}$ are the amplitude and delay of the l-th path, $\psi \in \Psi$ is the set of neighboring cells ($\Psi$ is the set of total cells, typically 504 in LTE), $$G(\tau_k^{(l)}) = \text{diag}\{1, e^{-j2\pi \Delta f \cdot \tau_k^{(l)}}, \ldots, e^{-j2\pi \cdot 63 \cdot \Delta f \cdot \tau_k^{(l)}}\} (\Delta f = 15 \text{ KHz}),$$

and Z is complex white Gaussian noise with $CN(0, \sigma_z^2 \cdot I)$. It should be noted for purposes of the subject disclosure that $\tau_k$ can be considered a vector of length $L_k$.

One signal metric that can be employed to detect neighboring cells or can be utilized to effectuate or facilitate the NCS procedure is:

$$\Lambda(r | H_k) = \max_{\tau_k} \sum_{l=1}^{L_k} |F(\tau_k^{(l)}; s_k, r)|^2.$$

This metric can be obtained by determining the dot-product of a received signal r with a SSC sequence $s_k$ ($r * s_k$) ascertaining its squared Fast Fourier Transform (FFT), selecting the largest $L_k$ taps (if $L_k$ is unknown, use a pre-established or dynamically determined threshold value), wherein the sum of the energy of these taps or the sum tap values can be denoted as the signal metric for a particular cell k. As will be appreciated by those moderately conversant in this field of endeavor and without limitation or loss of generality, a "tap" in this context typically refers to time taps—by which signals transmitted and/or received in the frequency domain can be identified in the time domain. Moreover, for purposes of clarification rather than limitation, a "dot-product" is typically the element-wise product of two vectors. For example, $$r * s_k = [r(1) \cdot s_k(1) r(2) \cdot s_k(2) \ldots r(64) \cdot s_k(64)].$$

Additionally, it should also be noted that as employed in this application the terms "the sum of the energy" and "the sum tap-values" have been utilized interchangeably and as a consequence are intended to connote an identical or similar concept.

To provide a brief, but non-limiting, synopsis of the subject disclosure, and in particular to place the extraction of signal metrics process for purposes of NCS in better perspective, it will be observed that in the case of single observations (e.g., no multiple radio frames or multi-antenna), the received signal is typically a weighted sum of the SSC sequences of neighboring cells together with noise. Accordingly, to extract the signal metrics for purposes of NCS, the dot-product of a received signal combined with each SSC sequence can initially be ascertained (e.g., the dot-product of each received signal combined with each SSC sequence can be determined), after which the FFT of each of the dot-products can be determined. At this stage, the FFT of each of the dot-products can be considered to correspond with a candidate cell. Then for each FFT (e.g., corresponding with a candidate cell) a determination can be made as to whether or not there is multipath propagation, multipath propagation with known $L_k$, or multipath propagation with unknown $L_k$. Where there is no multipath propagation, a comparison can be made as to the values of time taps of the FFT, and based at least in part on the time taps, the time tap with the largest value can be selected and assigned to be the signal metric for the candidate cell. Where there is multipath propagation with known $L_k$, a comparison can also be made as to the values of time taps of the FFT, but in this instance, the $L_k$ time taps with the largest sum tap-values can be selected and assigned to be the signal metric for the candidate cell. Where there is multipath propagation with unknown $L_k$, various threshold methods can be employed to determine $L_k$ after which the values of time taps of the FFT can be compared whereupon the $L_k$ time taps with the largest sum tap-values identified and assigned to be the signal metric of the candidate cell. Once a signal metric has been obtained for each candidate cell, the signal metrics for each of the candidate cells can be compared and the cell with the largest signal metric can be ascribed as being the detected cell.

Figure 3:
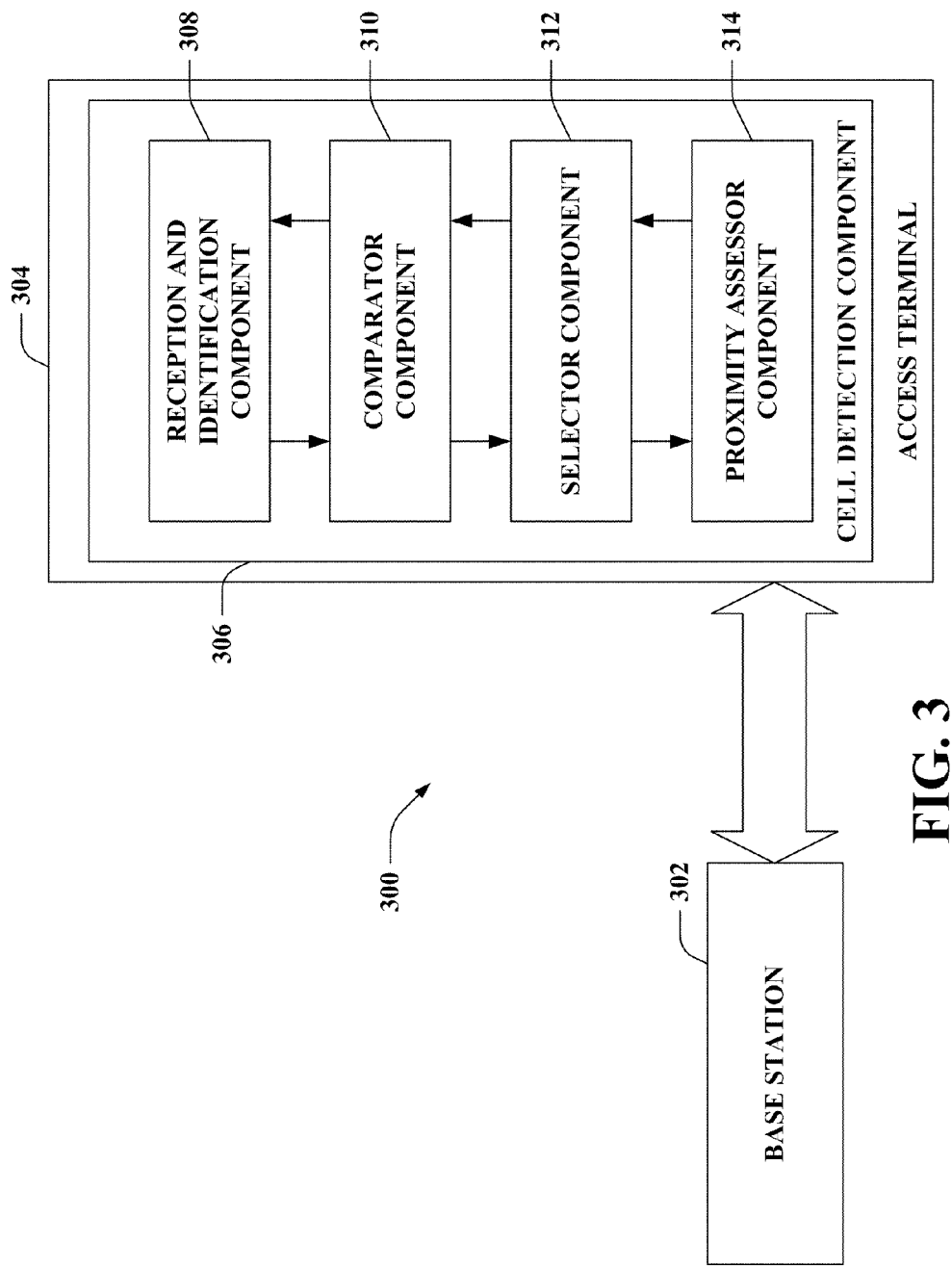
FIG. 3 is an illustration of an example system that facilitates and/or effectuates searching and/or tracking of neighboring cells for purposes of handover or other applications in accordance with various aspects of the subject disclosure.

Turning now to FIG. 3 that illustrates a system 300 that effectuates and/or facilitates cell search and/or tracking of neighboring cells for handover or other applications, such as, location inference and/or cooperative transmission from base stations in wireless communications environments. As depicted, a base station 302 (hereinafter, depending on context, also referred to as "serving base station 302") can be in continuous and/or operative or sporadic and/or intermittent communication with an access terminal 304 for the purpose of effectuating and/or facilitating cell search (e.g., initial cell searching when access terminal 304 is switched on, or when access terminal 304 loses connection with its serving base station) or neighboring cell search (e.g., performed when access terminal 304 is already connected to serving base station 302 and is in the process of detecting a new neighbor cell). Since the rudimentary functionality of base station 302 and access terminal 304, respectively, have been expounded upon above in connection with FIG. 1 and FIG. 2, a further detailed description of such features has been omitted for the sake of brevity and to avoid needless prolixity. Nevertheless, as illustrated access terminal 304, in this instance, can include cell detection component 306. Cell detection component 306, in accordance with various embodiments and/or aspects described below, can receive signals from a disparate plurality of cells and thereafter can select or identify a set or subset of candidate cells k, based at least in part on the received signals. Cell detection component 306 subsequently, based at least in part on the set or subset of identified candidate cells, can compare the signal metric for each of the identified cells, select signal metrics for each of the identified candidate cells that satisfy pre-established or dynamically and/or contemporaneously ascertained criteria, and thereafter by comparing the corresponding signal metrics of each of the selected candidate cells can identify proximate base stations situated or located in neighboring cells.

In order to effectuate and/or facilitate the foregoing therefore, cell detection component 306 can include reception and identification component 308 that can receive a signal in a multipath channel wherein the received signal can be represented as $$r = \sum_{k \in \psi} \sum_{l=1}^{L_k} \alpha_k^{(l)} \cdot G(\tau_k^{(l)}) \cdot s_k + z.$$

The received signal can then be processed by reception and identification component 308 to identify particular cell IDs included in the received signal. Reception and identification component 308 can detect or identify a particular cell by utilizing a signal metric of the form $$\Lambda(r \mid H_k) = \max_{\tau_k} \sum_{l=1}^{L_k} |F(\tau_k^{(l)}; s_k, r)|^2$$

wherein the dot-product of the received signal r with SSC sequences $s_k$ (e.g., $r^*s_k$) is ascertained. Reception and identification component 308 can thereafter square the FFT of the resultant dot-product, and pick the largest $L_k$ taps. Where $L_k$ is unknown, reception and identification component 308 can utilize pre-established or dynamically determined threshold values. The sum of the energy of the largest $L_k$ taps or sum tap values can thus represent the signal metric for a particular cell k or a set or subset of cells k.

Figure 6:
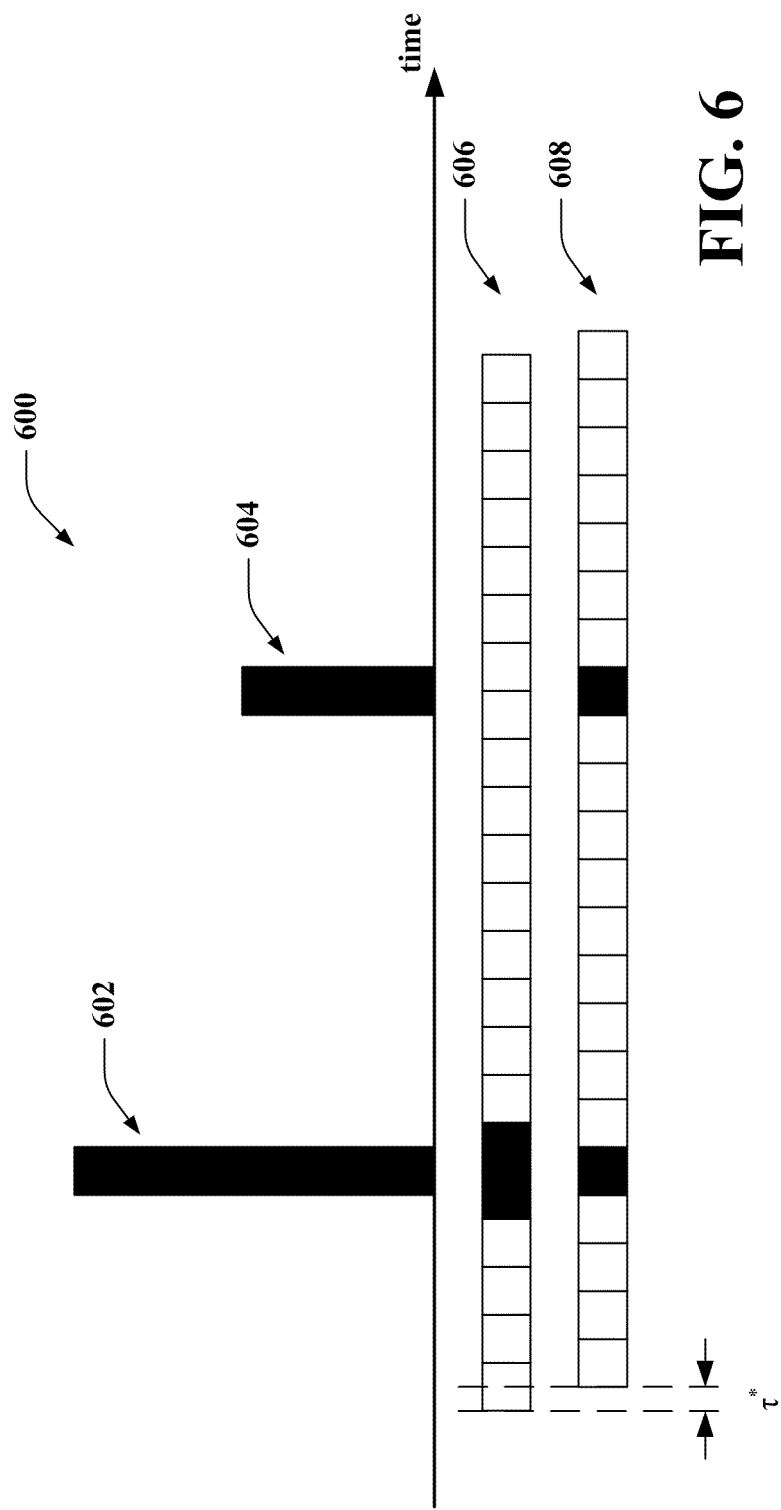
FIG. 6 depicts the functioning of an illustrative sliding FFT window in accordance with various aspects of the subject disclosure.

Once the signal metric for a particular cell k, or set or subset of cells k has been determined, the signal metric $\Lambda(r|H_k)$ over all candidate cells k can be compared by comparator component 310. Cells exhibiting maximum signal metrics can be isolated as being detected cells, corresponding taps can thereafter be classified as multipath taps. Once candidate cells k have been isolated, selector component 312 can be employed to further enhance the selection of candidate cells k. Selector component 312 can employ various resolution enhancement techniques including utilization of sliding FFT windows whereby all the delay taps $\tau_k^{(l)}$ can take discrete values n/64Δf through FFT, and resolution can be improved by shifting all the delay taps with constant τ* which can be equivalent to applying phase ramping G(τ*) on the dot-product $r^*s_k$ before FFT. Such a technique can better capture the multipath components as illustrated in FIG. 6.

Additional techniques that can also be utilized by selector component 312 to refine resolution of possible candidate cells k can include utilization of signal metric combining from multiple observations over time (e.g., multiple radio frame) and space (e.g., multi-antenna) in different channels, wherein the superimposed received signal can be represented as:

$$r[t] = \sum_{k \in \psi} \sum_{l=1}^{L_k} \alpha_k^{(l)}[t] \cdot G(\tau_k^{(l)}[t]) \cdot s_k + z[t],$$

$$t = 1, 2, \ldots, N_{ob}$$

where t is the index of the observation (ob). The signal metric combining technique can typically be employed to coherently combine the observations prior to processing. For example, where $\tau_k^{(l)}[t]$ is the same and $\alpha_k^{(l)}[t]$ is the same, then the signal metric becomes:

$$\Lambda(r \mid H_k) = \max_{\tau_k} \sum_{l=1}^{L_k} \left| F\left(\tau_k^{(l)}; s_k, \sum_{t=1}^{T_{ob}} r[t]\right) \right|^2.$$

Similarly, the signal metric combining technique can also be utilized by selector component 312 to non-coherently combine signal metrics wherein signal metrics from individual observations are added together before picking or selecting the largest $L_k$ taps for the total signal metric. In this instance, the signal metric can be represented as:

$$\Lambda(r \mid H_k) = \max_{\tau_k} \sum_{l=1}^{L_k} \left\{ \sum_{t=1}^{T_{ob}} |F(\tau_k^{(l)}; s_k, r[t])|^2 \right\}$$

where $\tau_k^{(l)}[t]$ is the same but $\alpha_k^{(l)}[t]$ is independent. Furthermore, the signal metric combining technique can also be employed by selector component 312 to undertake totally incoherent combining wherein the largest $L_k$ taps are selected prior to combining the signal metric over different or disparate observations. The signal metric for the purpose of totally incoherently combining can be represented as:

$$\Lambda(r \mid H_k) = \sum_{t=1}^{T_{ob}} \max_{\tau_k} \sum_{l=1}^{L_k} |F(\tau_k^{(l)}[t]; s_k, r[t])|^2$$

where $\tau_k^{(l)}[t]$ is independent and $\alpha_k^{(l)}[t]$ is independent.

Further, selector component 312 can also facilitate or effectuate successive multi-cell detection through utilization of one or more interference cancellation techniques, wherein, for example, after detecting each cell, the cell's channel gain $\alpha_k^{(l)}$ can be estimated based at least in part on a residual signal $\tilde{r}$ and detected $s_k$ and $\tau_k^{(l)}$. Selector component 312 can perform the estimation in conjunction with a minimum mean squared error (MMSE) or matched filter (MF) estimator, for example. Once selector component 312 has performed the estimation, it can apply inference cancellation of the form:

$$\tilde{r} = r - \sum_{l=1}^{L_k} \hat{\alpha}_k^{(l)} \cdot G(\hat{\tau}_k^{(l)}) \cdot s_k.$$

Moreover, selection component 312 can also employ successive multi-cell detection through MMSE inference suppression wherein $\tilde{\psi}$ can represent the detected cell set, and the MMSE suppression aspect, which is one illustrative linear approach for detecting $G(\tau_k^{(l)}) \cdot s_k$, can utilize:

$$\tilde{s}_k = \left( \sum_{m \in \tilde{\psi}} \sum_{l=1}^{L_m} |\hat{\alpha}_m^{(l)}|^2 \cdot s_m^H \cdot s_m + \sigma_z^2 \cdot I \right)^{-1} \cdot G(\tau_k^{(l)}) \cdot s_k$$

Additionally and/or alternatively, selector component 312 can also employ joint channel estimation with all currently detected cells. Utilization of joint channel estimation can reduce the channel estimation error propagation during successive detection and hence reduce overall error propagation.

Once selector component 312 has whittled down the selection of candidate cells k through use of the various resolution enhancement strategies elucidated above, proximity assessor component 314 identifies which of the selected candidate cells k should be identified as the proximate base station located in neighboring cells.

Figure 4:
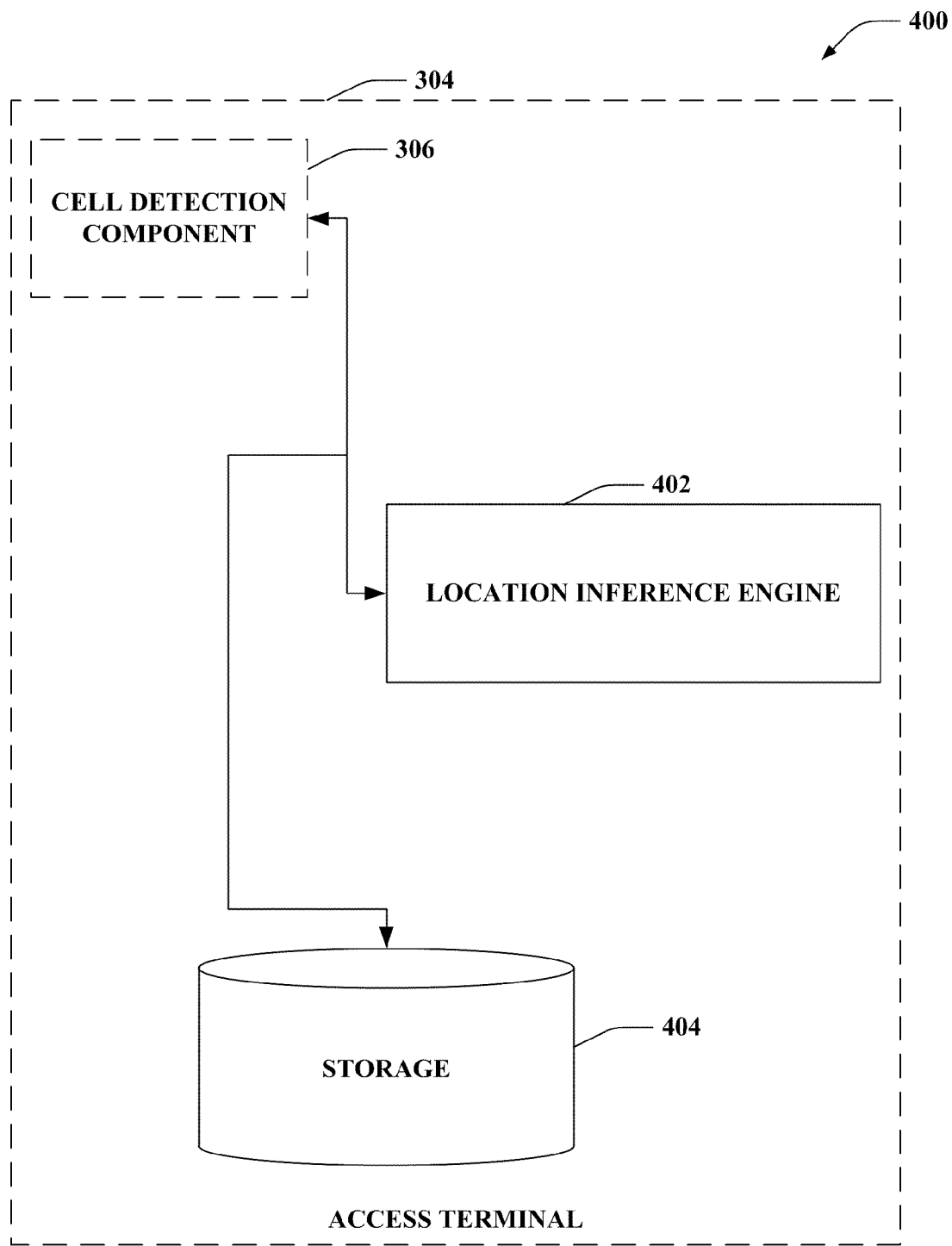
FIG. 4 is an illustration of an example system that facilitates and/or effectuates searching and/or tracking of neighboring cells for purposes of handover or other applications in accordance with various aspects of the subject disclosure.

FIG. 4 depicts a location inference aspect 400 that can be employed in conjunction with the functionalities and/or facilities provided by cell detection component 306. As illustrated the location inference aspect 400 can be included within an access terminal 304 wherein cell detection component 304 can be communicatively and/or operatively coupled to location inference engine 402 and storage 404. Since the various and diverse functionalities and/or facilities of access terminal 304 and cell detection component 306 have been expounded upon in relation to FIG. 1, FIG. 2, and FIG. 3 above, for the sake of brevity of exposition, further recitation of such features has been omitted. Nevertheless as depicted, location inference engine 402 can utilize input received from cell detection component 306 to ascertain the current location of access terminal 304 with respect to one or more detected (neighboring) cells as indicated by cell detection component 306. Thus, where access terminal 304, through the auspices of cell detection component 306, has knowledge of the locations of one or more base stations (e.g., base station 302), location inference engine 402, provided that certain predetermined conditions are satisfied, can advantageously employ this knowledge to estimate the current location of access terminal 304 in relation to the one or more detected base stations. Moreover, where access terminal 304 is uncertain, or has no knowledge, of the respective locations of the one or more base stations, location inference engine 402, once again provided that certain preconditions are satisfied, can dispatch or send indication to one of the base stations with which access terminal 304 is currently in communication that access terminal 304 is currently located within a particular or specific cell.

Some illustrative predetermined conditions that can need to be satisfied in order to trigger utilization of the location of the detected base station for the purposes of access terminal 304 location, can include situations where access terminal 304 can only find x number of neighboring cells during a defined time period Y. In this instance, the closest detected cell location can be employed by location inference engine 402 to infer the location of access terminal 304 with respect to the closest detected cell. Additional and/or alternative predetermined conditions that need also be satisfied can include utilization of one or more measurements to ascertain whether or not access terminal 304 should use the location of one or more of the detected base stations. Measurement metrics that can be employed to determine whether or not the one or more detected base stations should be utilized by access terminal 304 to ascertain the access terminal's location can include measurements related to path loss, signal to interference to noise ratio (SINR), received signal strength indicator (RSSI), time difference of arrival or reference signal received power (RSRP), or a combination of the foregoing metrics. Additional or alternative measurement metrics that can also be employed with equal applicability for the purposes of location inference can include time-of-arrival (TOA) or time-difference-of-arrival (TDOA) since this information (e.g., $\tau_k$) has typically been obtained from the NCS process.

For instance, location inference engine 402 can approximate the received signal strength from the kth base station from one or more channel parameters $$\left(e.g., P_k = \sum_{l=1}^{L_k} |\hat{\alpha}_k^{(l)}|^2\right)$$

followed by each $$SINR_k = P_k \bigg/ \sum_{m \in \psi \setminus \{m\}} P_m + P_{noise}.$$

As a further illustration, the SINR, signal strength of a reference signal, total received power, or any combination of the foregoing can be applied by location inference engine 402 for location inference. Thus, for example, where access terminal 304 (e.g., through utilization of cell detection component 306) detects a very strong base station k (e.g., its estimated SINR satisfies $$\frac{SINR_k}{SINR_m} > \gamma \forall\, m \in \psi \setminus \{m\},$$

where γ>1 is a predetermined threshold) then location inference engine 404 can approximate the location of access terminal 304 as being that of base station k, which can be obtained either from preloaded maps persisted on storage 404 or by access terminal 304 sending back an indication to the base station so that the base station determines the location of access terminal 304 by using its (e.g., the base station's) own known location as the location of access terminal 304. Similarly, where access terminal 304 (e.g., through utilization of cell detection component 306) finds its serving cell or a neighboring cell k on a list of femto-cells, picocells, or any other cell, access terminal 304 can attribute the location of the femto-cell as its location. Additionally and/or alternatively, access terminal 304 can dispatch an indication to the detected femto-cell wherein the base station serving the detected femto-cell can use its known location to provide relevant location information to access terminal 304 provided that the $SINR_k > \eta$, where η is a predetermined threshold.

Additionally and as illustrated, access terminal 304 can also include storage 404 that can be utilized to persist the various data and information necessary to effectuate various aspects of the subject disclosure. For example, storage 404 can persist preloaded maps, predetermined or pre-established parameters and thresholds, etc. As will be recognized by those ordinarily skilled in the art, storage 404 can include any suitable data necessary for cell detection component 306 and location inference engine 402 to facilitate its aims. For instance, storage 404 can include information regarding user data, data related to a portion of a transaction, historic data related to previous transactions, geographical location, activity across disparate networks, activity across a network, communication associated with a network, information obtained from disparate networks, etc.

It is further to be appreciated that storage 404 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Storage 404 of the subject systems and methods is intended to comprise, without being limited to, these and any other suitable types of memory. In addition, it is to be appreciated that storage 404 can also be a server, a database, a hard drive, and the like.

Figure 5:
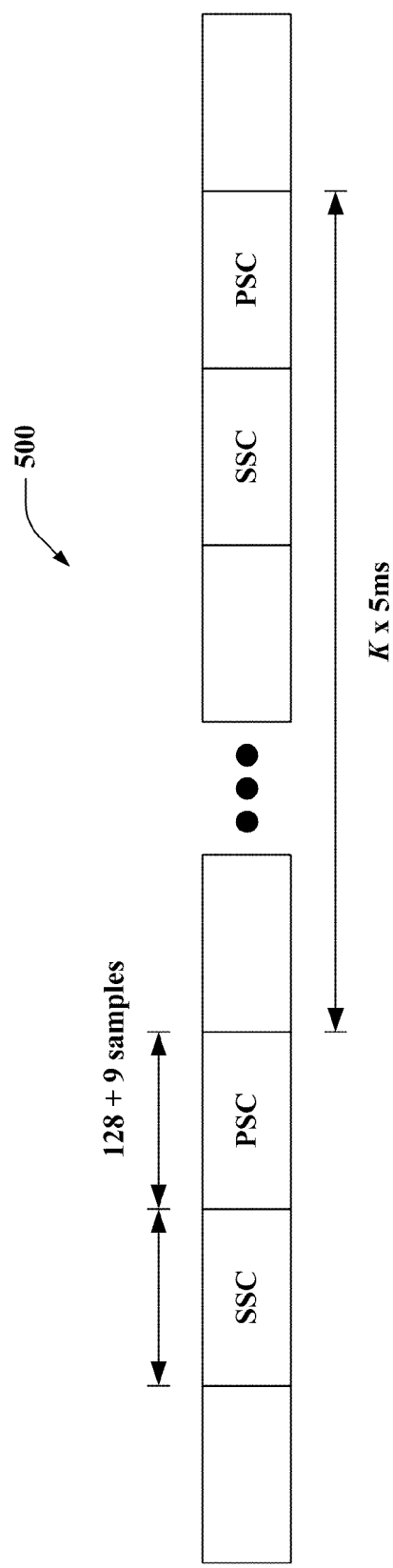
FIG. 5 a frame structure utilized in LTE systems in accordance with one or more aspects of the subject disclosure.

FIG. 5 illustrates a frame structure 500 utilized in LTE systems. As depicted, the frame structure can include SSC and PSC symbols that can be repeated with a periodicity of 5 ms where the system sample rate is 1.92 MHz, and the SSC and PSC symbols are of length-128 (oversampled by 2 times), for example. Typically in short cycle prefix (CP) models, the CP length is generally 9 samples.

FIG. 6 depicts the functioning of an illustrative sliding FFT window 600. As illustrated, two multipath time taps 602 and 604 are represented. As will be noticed, the initial FFT window 606 only captures (represented by the shaded area) the first multipath time tap 602 but does not capture the second subsequent or delayed multipath time tap 604. It has been found that by shifting or sliding the FFT window by an increment τ*, as illustrated by the second FFT window 608, that both multipath time taps 602 and 604 are captured thereby enhancing the resolution for delayed multipath time taps.

Figure 7:
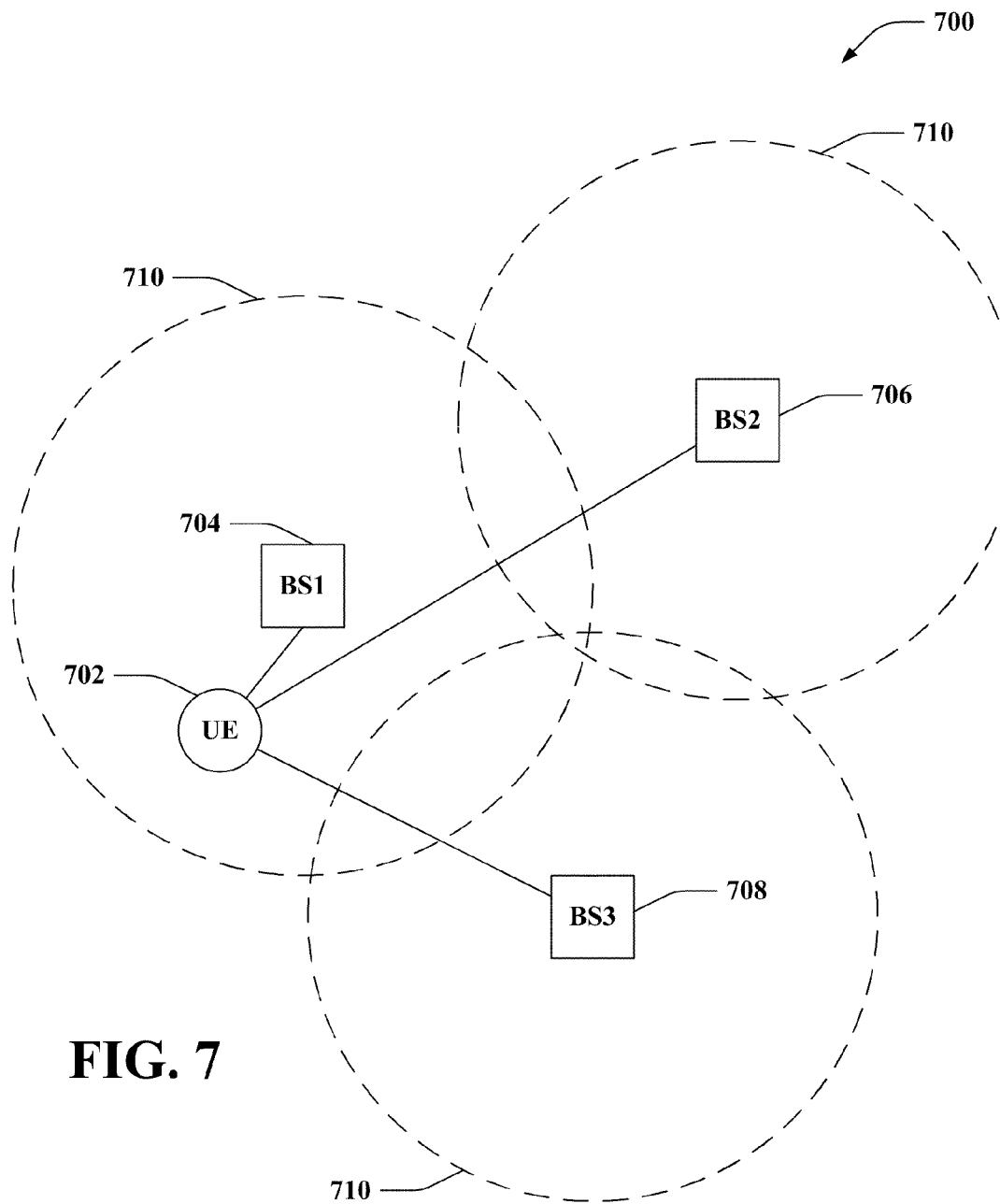
FIG. 7 illustrates a location inference aspect in accordance with various aspects of the subject disclosure.

FIG. 7 illustrates a location inference aspect 700 of the subject disclosure, wherein the location of access terminal or UE 702 can be determined by using the location of one or more detected cells. As illustrated, in addition to UE 702, there are three base stations 704-708 the coverage area each of which can overlap and each of which are substantially of the same power, as indicated by dashed circles 710. In this instance and as depicted, since UE 702 is more proximate to base station 704, through the facilities and functionalities provided by, and/or associated with, cell detection component 306 in conjunction with location inference engine 402, UE 702 can ascertain that since base station 704 is more detectably proximate to it than base stations 706 and 708, that the location of base station 704 is a better approximation of its location than base stations 706 and 708 and as a consequence that it (e.g., UE 702) can infer that it is substantially co-located with base station 704. It should be noted in this context that base stations 704-708 and UE 702 can beneficially and dynamically and/or continuously or sporadically interchange information with each other regarding their respective locations and further can exchange information regarding their locations in relation to one another. Thus for example, as UE 702 perambulates amongst and between base stations 704-708, each of base stations 704-708 dispatches location information to UE 702. Additionally, each of base stations 704-708 can dispatch location information regarding specific base station location information to UE 702. For instance, where a serving base station (e.g., base station 704) detects that UE 702 is moving towards the coverage area circumscribed by base station 706, the serving base station (e.g., base station 704) can direct or dispatch location information associated with base station 706 to UE 702. Further, UE 702 can also report or interchange its location information both to its serving base station (e.g., 704) and to other relatively proximate base stations (e.g. base stations 706-708), for example by way of a flag, to indicate that a specific serving base station location should be employed as its location in preference to the actual deduced location.

Figure 8:
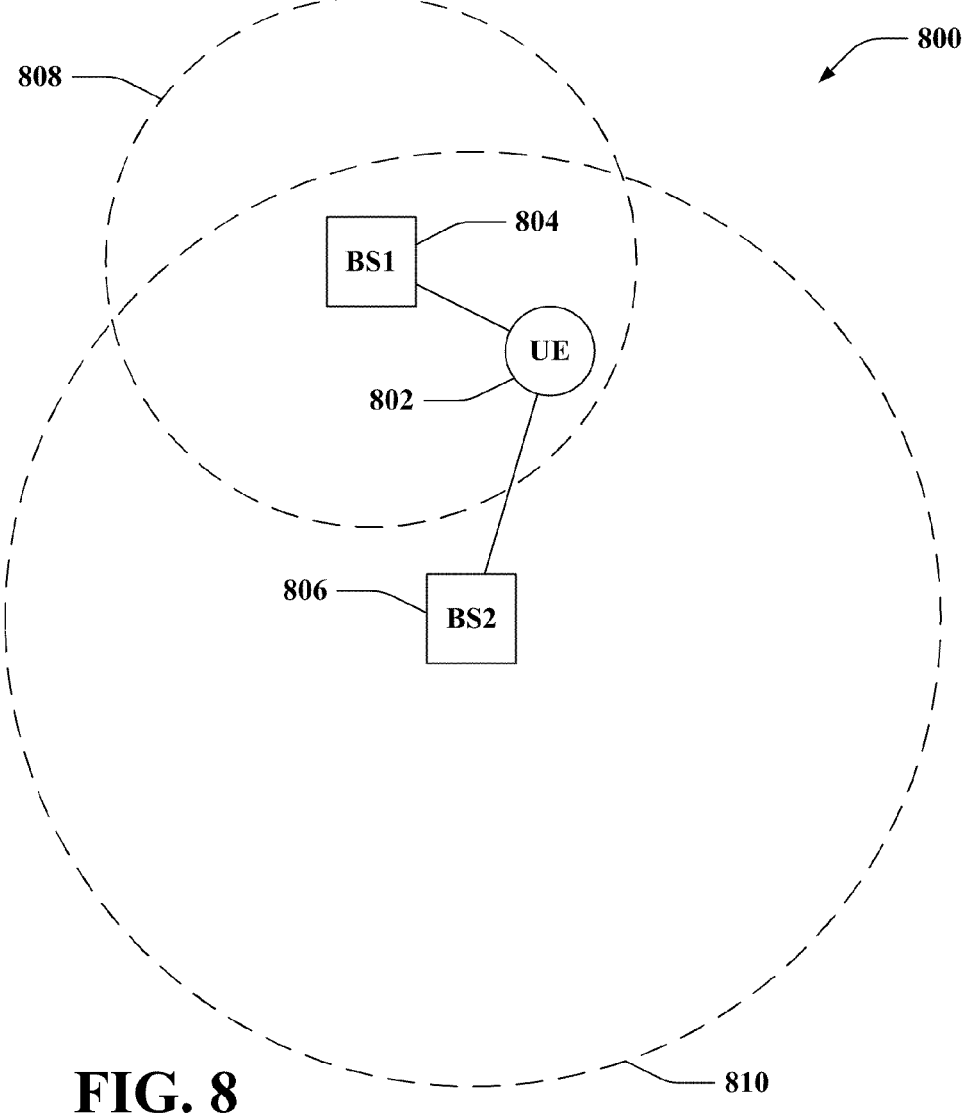
FIG. 8 provides further illustration of the location inference aspect in accordance with various aspects of the subject disclosure.

FIG. 8 provides further illustration 800 of the location inference aspect of the subject disclosure. In accordance with this aspect, the location of access terminal or UE 802 can be determined by using the location of one or more detected cells. In this instance, base station 804 is a femto-cell with a coverage area 808 that overlaps with the coverage area 810 cast by base station 806. Here UE 802, once again through the functionalities and facilities supplied by cell detection component 306 in conjunction with location inference engine 402, can determine from the signals directed at it by base station 804 that base station 804 is a femto-cell, and moreover given the relative strengths of the signals emanating from each of base station 804 and 806 that it should preferentially be co-located with base station 804. On the other hand, UE 802 can employ the relative directions and signal strengths emitted by each of base stations 804 and 806 to also determine its location with respect to both base stations (e.g., base stations 804 and 806), or alternatively, each of base station 804 and 806 can render the location of UE 802 based at least in part on signals received from UE 802. Accordingly, where UE 802 is aware of, or has detected and/or inferred, the location of each of the base stations within its vicinage, UE 802 can employ the location of at least one of the detected and/or inferred base stations 804 and/or 806 to estimate its location with respect to each of base station 804 and/or 806 provided certain conditions, as discussed above, are satisfied. If on the other hand, UE 802 is unaware of, or has failed to detect and/or infer, the location of the base stations within its vicinity, it can disseminate an indication to at least one of the base stations with which it is in communication (e.g., typically its current serving base station) as to its (e.g., UE 802) current location provided that the conditions outlined above are met.

Figure 9:
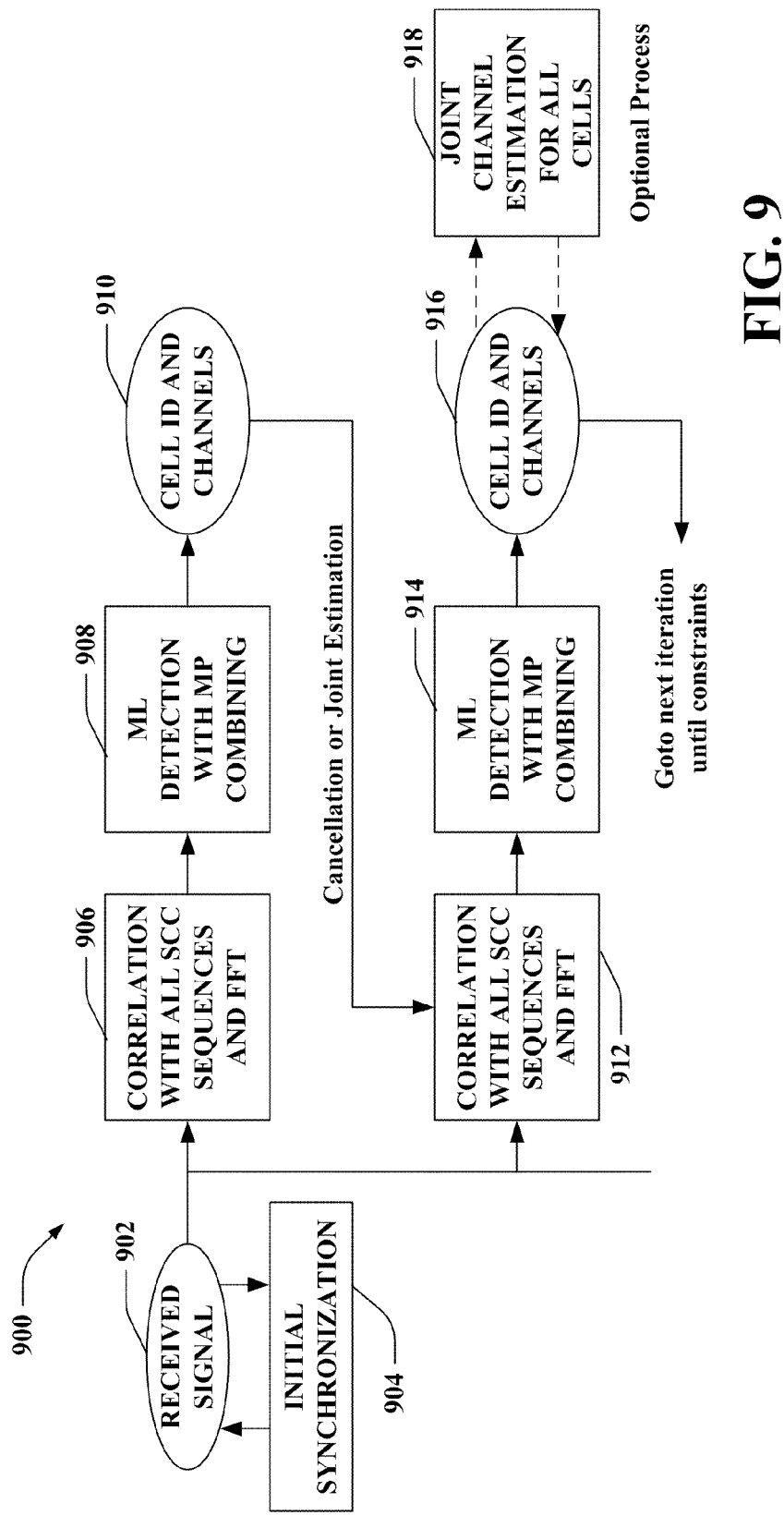
FIG. 9 illustrates a general process flow diagram depicting an illustrative neighboring cell detection process in accordance with an aspect of the subject disclosure.

FIG. 9 illustrates a general process flow diagram 900 depicting an illustrative neighboring cell detection process in accordance with an aspect of the subject disclosure. Upon receiving a signal at 902, an initial synchronization can be performed at 904. This can be followed by a FFT of the received signal and a correlation with all SSC sequences at 906. The result of the FFT and the correlation can then be provided to a maximum likelihood (ML) detector, or any other detector, with maximum probability or peak (MP) combining at 908. As will be appreciated by those of moderate comprehension in this field of endeavor, other detectors or combinations of detectors can be employed without departing from the intent and/or purview of the subject disclosure. The output can be forwarded in order to generate neighboring cell IDs and available channel information. The cell IDs and available channels can be used to determine any one or more of cancellation or joint estimation, using (in accordance with some aspects) an output from the received signal at 910.

The cancellation and/or joint estimation can be initially formulated by a procedure of an FFT of the received signal and correlation (in combination with the synchronized received signal) at 912. These results can be provided to a ML detector, with MP combining at 914, for example. This can be output to provide the cell ID and available channels at 916. This sequence of acts can be iterated through repeatedly for each set or cell to develop a hierarchy of neighboring cell information wherein each iteration can utilize different constraints or use modified constraints, as determined necessary, or can be iterated through for different cell/signal information until a constraint is encountered. Optionally or additionally, joint channel estimation can also be provided for all cells at 918.

Figure 10:
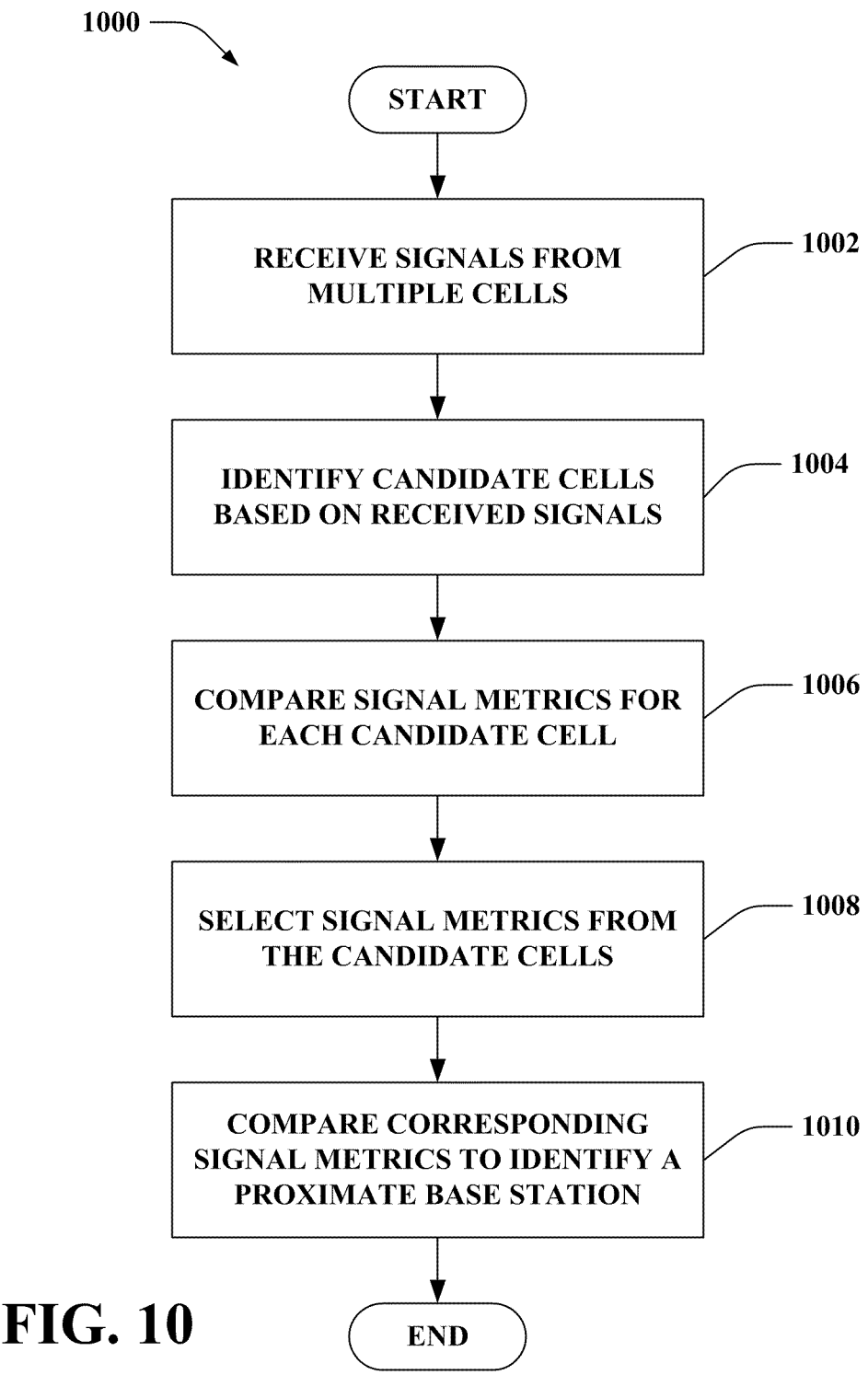
FIG. 10 is an illustration of an example methodology that facilitates and/or effectuates searching and/or tracking of neighboring cells for purposes of handover or other applications in accordance with various aspects of the subject disclosure.
Figure 11:
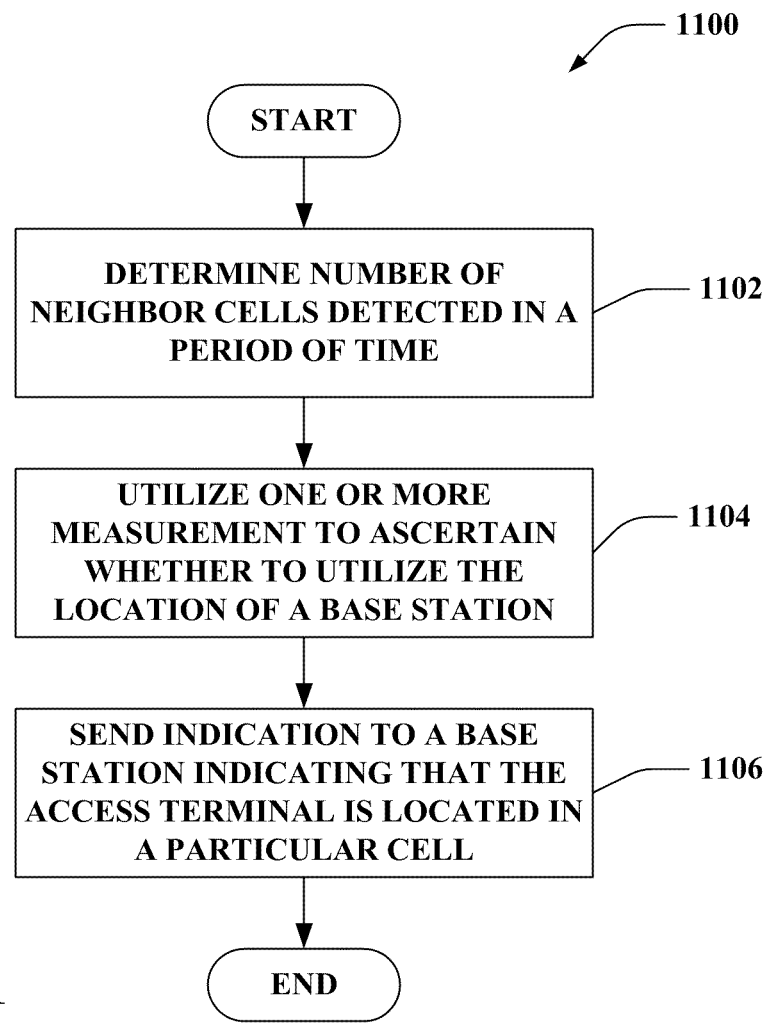
FIG. 11 is an illustration of an example methodology that facilitates and/or effectuates searching and/or tracking of neighboring cells for purposes of handover or other applications in accordance with various aspects of the subject disclosure.

Referring to FIG. 10 and FIG. 11, methodologies relating to the searching and/or tracking of neighboring cells for handover or location inference are respectively illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 10, an illustrative methodology 1000 is presented for the searching and/or tracking of neighboring cells. Methodology 1000 can commence at 1002 where signals from one or more cells can be received. At 1004, based at least in part on the received signals, candidate cells from the one or more cells can be identified. At 1006 signal metrics for each candidate cell can be compared, and at 1008 signal metrics from candidate cells (e.g., one or more disparate candidate cell) can be selected. At 1010 corresponding signal metrics can be compared to identify a proximate base station operating in a neighboring cell.

With reference to FIG. 11, a further illustrative methodology 1100 is presented that effectuates and/or facilitates location inference in accordance with one or more embodiments of the subject disclosure. Methodology 1100 can commence at 1102 where a determination can be made as to the number of neighbor cells that have been detected in a defined period of time. At 1104 one or more measurement metric can be utilized to ascertain whether or not to utilize the location of detected base station situated within a neighboring cell. At 1106 an indication can be sent to a base station indicating that an access terminal is located within an identified cell.

Figure 12:
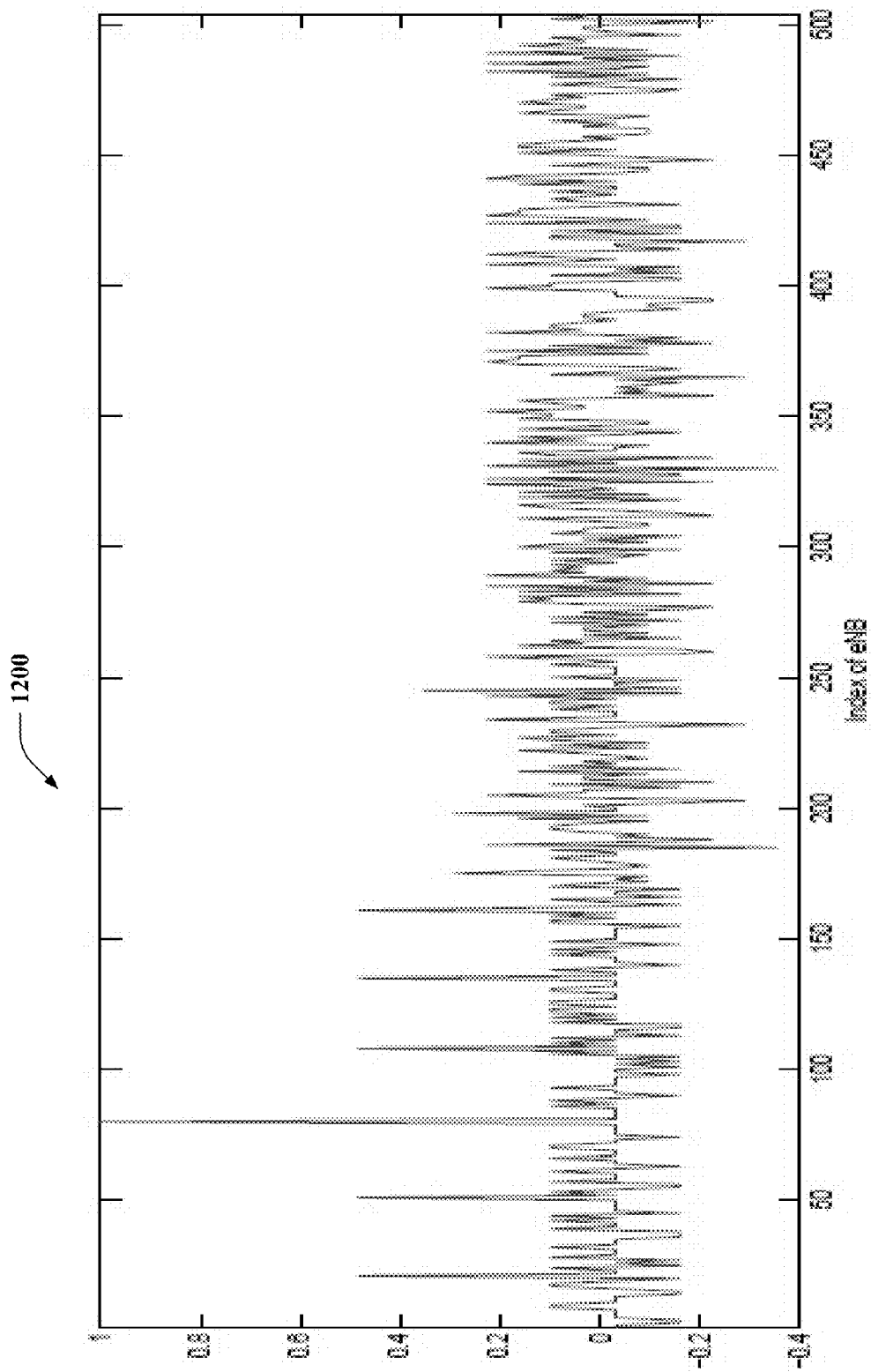
FIG. 12 is an illustration of the strong side lobes of a cross-correlation function $s_{80}$ with all SSC sequences.

FIG. 12 provides depiction 1200 of the strong side lobes of a cross-correlation function $s_{80}$ with all SSC sequences. As will be observed, besides the peak of maximum value at index 80, there are five sub lobes with value 0.5. These side lobes can be due to the collision of $\tilde{s}(m_0) \otimes \tilde{c}(N_{ID}^{(2)})$ for the cells in the same cell group.

It will be appreciated that, in accordance with one or more aspects described herein, inferences can be made regarding searching and/or tracking neighboring cells for purposes of handover and/or other applications, such as location inference and/or cooperative transmission from base stations. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 13:
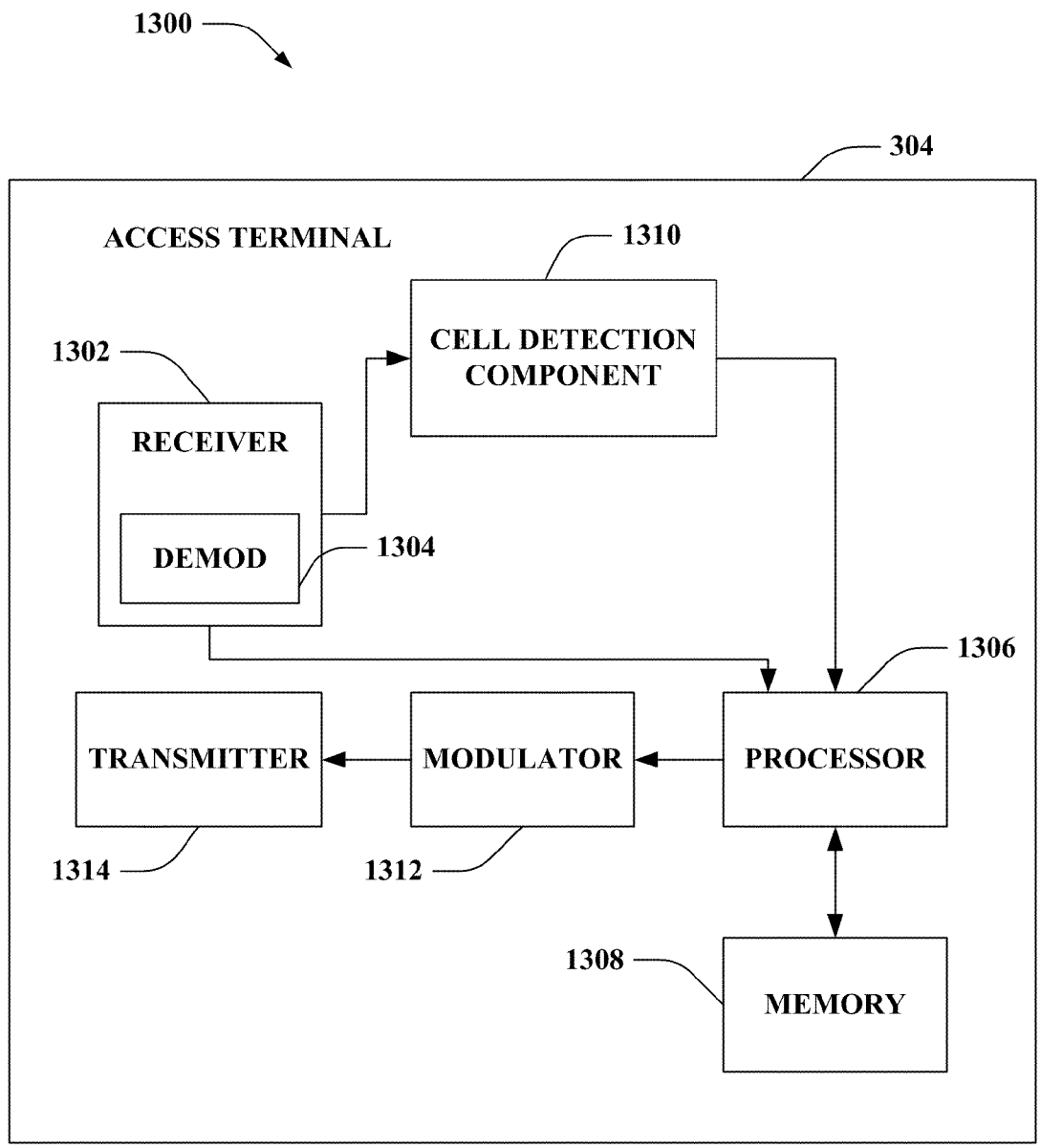
FIG. 13 is an illustration of an example access terminal that facilitates and/or effectuates searching and/or tracking of neighboring cells for purposes of handover or other applications in a wireless communication system.

FIG. 13 is an illustration 1300 of an access terminal 304 that effectuates searching and/or tracking of neighboring cells for purposes of handover or other applications, such as, location inference and/or cooperative transmission from base stations. Access terminal 304 comprises a receiver 1302 that receives a signal from, for instance, a receive antenna (not shown), and performs typical actions thereon (e.g., filters, amplifies, downconverts, etc.) the received signal and digitizes the conditioned signal to obtain samples. Receiver 1302 can be, for example, an MMSE receiver, and can comprise a demodulator 1304 that can demodulate received symbols and provide them to a processor 1306 for channel estimation. Processor 1306 can be a processor dedicated to analyzing information received by receiver 1302 and/or generating information for transmission by a transmitter 1314, a processor that controls one or more components of access terminal 304, and/or a processor that both analyzes information received by receiver 1302, generates information for transmission by transmitter 1314, and controls one or more components of access terminal 304.

Access terminal 304 can additionally comprise memory 1308 that is operatively coupled to processor 1306 and that can store data to be transmitted, received data, and any other suitable information related to performing the various actions and functions set forth herein. For instance, memory 1308 can store group-specific signaling constraints employed by one or more base stations. Memory 1308 can additionally store protocols and/or algorithms associated with identifying signaling constraints used for communicating resource block assignments and/or employing such signaling constraints to analyze received assignment messages.

It will be appreciated that the data store (e.g., memory 1308) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1308 of the subject systems and methods is intended to comprise, without being limited to, these and any other suitable types of memory.

Receiver 1302 is further operatively coupled to a cell detection component 1310 which can be substantially similar to cell detection component 306 of FIG. 3. Cell detection component 1310 can be employed to search and/or track of neighboring cells for purposes of handover or other applications, such as, location inference and/or cooperative transmission from base stations. Access terminal 304 still further comprises a modulator 1312 and a transmitter 1314 that transmits the signal to, for instance, a base station, another access terminal, etc. Although depicted as being separate from the processor 1306, it is to be appreciated that cell detection component 1310 and/or modulator 1312 can be part of processor 1306 or a number of processors (not shown).

Figure 14:
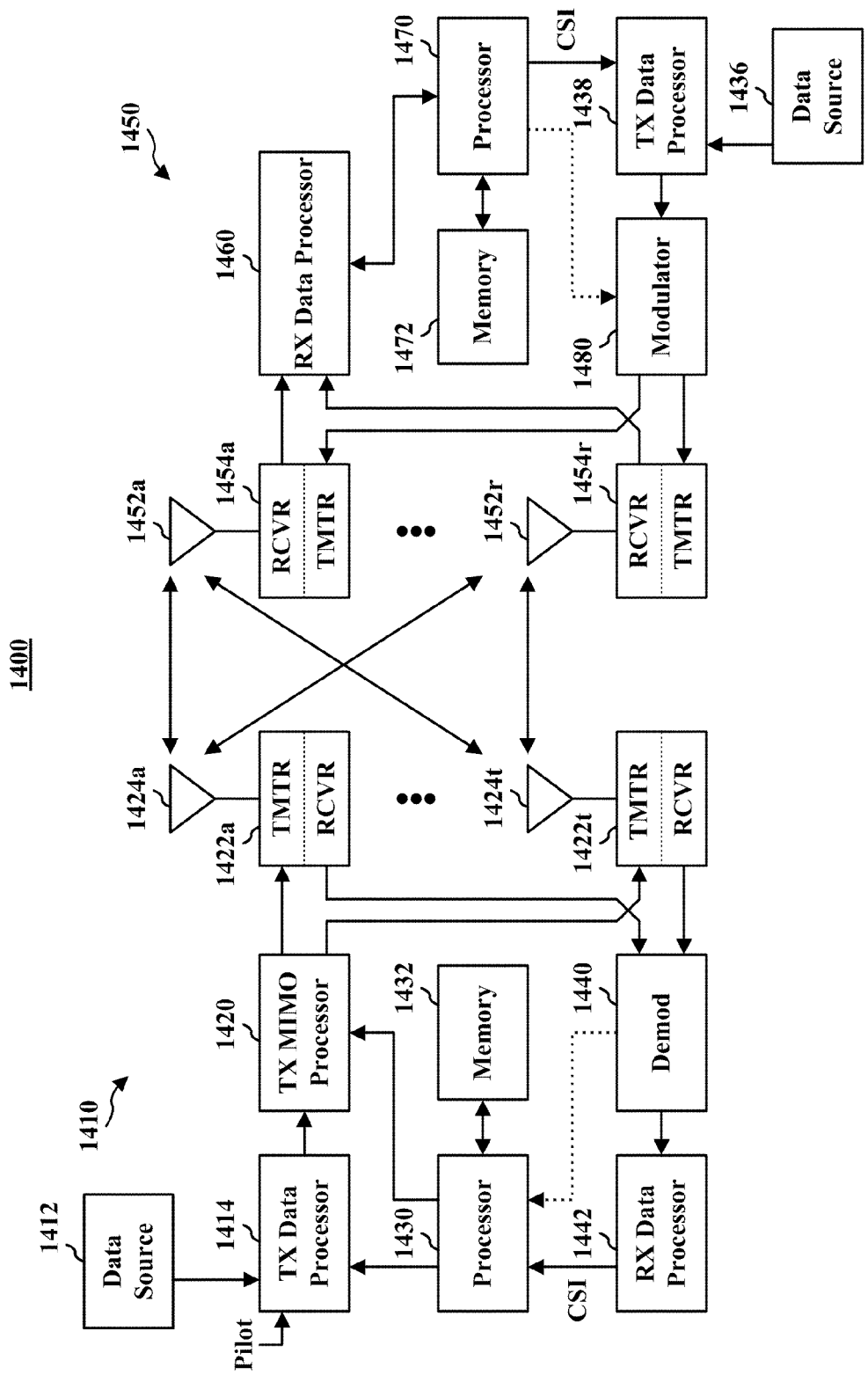
FIG. 14 is an illustration of an example wireless network environment that can be employed in conjunction with the various systems and methods described herein.

FIG. 14 shows an example wireless communication system 1400. The wireless communication system 1400 depicts one base station 1410 and one access terminal 1450 for sake of brevity. However, it is to be appreciated that system 1400 can include more than one base station and/or more than one access terminal, wherein additional base stations and/or access terminals can be substantially similar or different from example base station 1410 and access terminal 1450 described below. In addition, it is to be appreciated that base station 1410 and/or access terminal 1450 can employ the systems (FIGS. 1-4) and/or method (FIGS. 10-11) described herein to facilitate wireless communication there between.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At access terminal 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which available technology to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from access terminal 1450 are received by antennas 1424, conditioned by receivers 1422, demodulated by a demodulator 1440, and processed by a RX data processor 1442 to extract the reverse link message transmitted by access terminal 1450. Further, processor 1430 can process the extracted message to determine which precoding matrix to use for determining the beamforming weights.

Processors 1430 and 1470 can direct (e.g., control, coordinate, manage, etc.) operation at base station 1410 and access terminal 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 15:
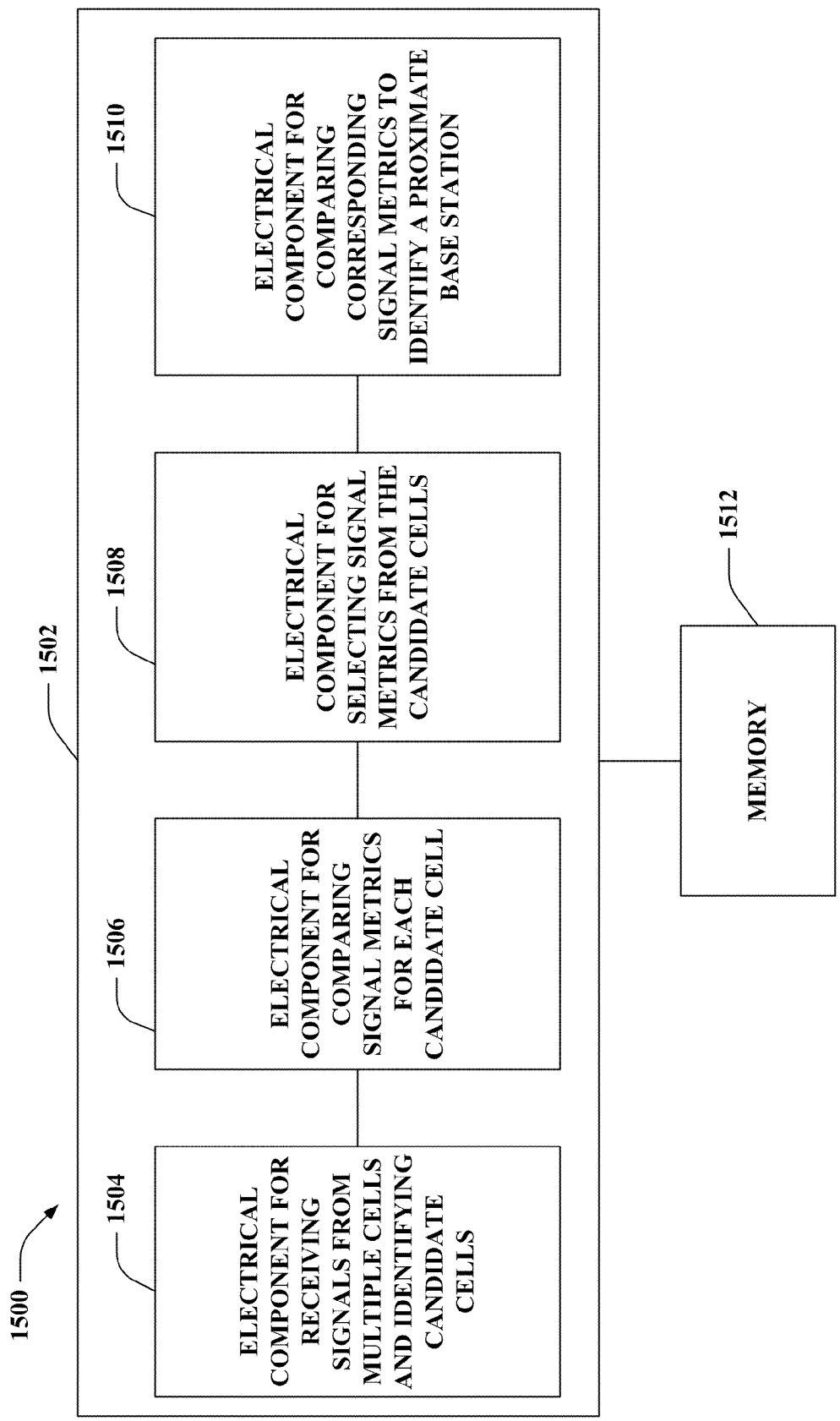
FIG. 15 is an illustration of an example system that facilitates and/or effectuates searching and/or tracking of neighboring cells for purposes of handover or other applications in a wireless communication environment.

Turning to FIG. 15, illustrated is a system 1500 that effectuates or facilitates searching and/or tracking of neighboring cells for purposes of handover or other applications, such as, location inference and/or cooperative transmission from base stations. System 1500 can reside within an access terminal, for instance. As depicted, system 1500 includes functional blocks that can represent functions implemented by a processor, software, or combination thereof (e.g., firmware). System 1500 includes a logical grouping 1502 of electrical components that can act in conjunction. Logical grouping 1502 can include an electrical component for receiving signals from multiple cells and identifying candidate cells 1504. Further, logical grouping 1502 can include an electrical component for comparing signal metrics for each candidate cell 1506. Moreover, logical grouping 1502 can include an electrical component for selecting signal metrics from the candidate cells 1508. Furthermore, logical grouping 1502 can include an electrical component for comparing corresponding signal metrics to identify a proximate base station 1510. Additionally, system 1500 can include a memory 1512 that retains instructions for executing functions associated with electrical components 1504, 1506, 1508, and 1510. While shown as being external to memory 1512, it is to be understood that electrical components 1504, 1506, 1508, and 1510 can exist within memory 1512.

Figure 16:
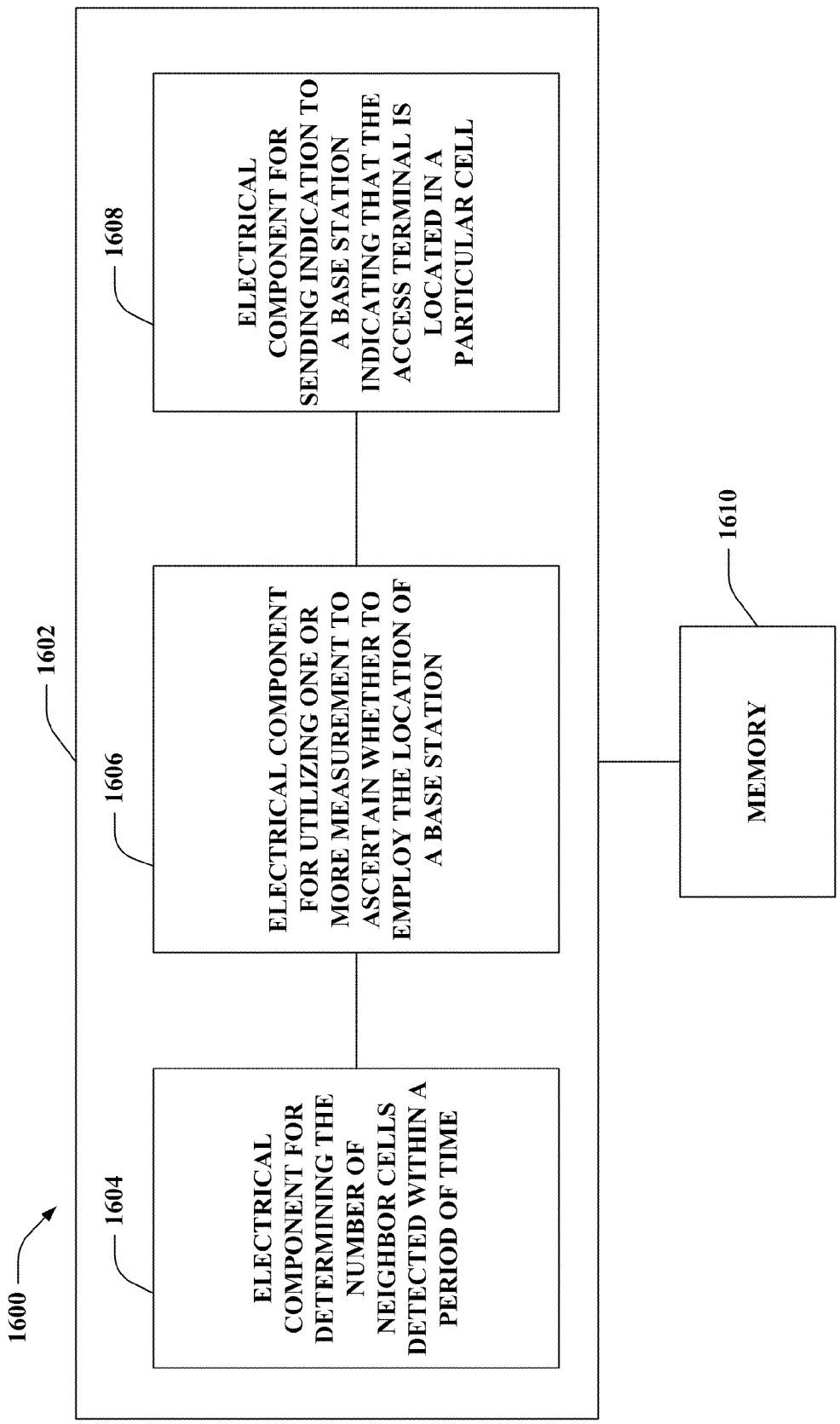
FIG. 16 is an illustration of a further example system that facilitates and/or effectuates searching and/or tracking of neighboring cells for purposes of handover or other applications in a wireless communication environment.

Turning to FIG. 16, illustrated is a system 1600 that facilitates and/or effectuates searching and/or tracking of neighboring cells for purposes of handover or other applications, such as, location inference and/or cooperative transmission from base stations. System 1600 can reside within an access terminal, for instance. As depicted, system 1600 includes functional blocks that can represent functions implemented by a processor, software, or combination thereof (e.g., firmware). System 1600 includes a logical grouping 1602 of electrical components that can act in conjunction. Logical grouping 1602 can include an electrical component for determining the number of neighbor cells detected within a period of time 1604. Further, logical grouping 1602 can include an electrical component for utilizing one or more measurement to ascertain whether to employ the location of a base station 1606. Moreover, logical grouping 1602 can include an electrical component for sending indication to a base station indicating that the access terminal is located in a particular cell 1608. Additionally, system 1600 can include a memory 1610 that retains instructions for executing functions associated with electrical components 1604, 1606, and 1608. While shown as being external to memory 1610, it is to be understood that electrical components 1604, 1606, and 1608 can exist within memory 1610.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that effectuates detecting a cell k in a multi-channel wireless communication environment, comprising:
   receiving signals from a plurality of cells, wherein the signals from the plurality of cells include a secondary synchronization channel (SSC) sequence $S_k$ for each of the plurality of cells;
   identifying candidate cells k based at least in part on the received signals;
   selecting one or more signal metrics associated with each of the candidate cells k;
   determining a dot-product for each of the received signals with the SSC sequences $S_k$ for each of the candidate cells k;
   determining a fast Fourier transform (FFT) of the dot-product for each of the received signals with the SSC sequences $S_k$ of the candidate cells k;
   squaring the FFT of the dot-product for each of the received signals with the SSC sequences $S_k$ of the candidate cells k;
   determining a sum of $L_k$ taps based on the squared FFT for each of the candidate cells k, wherein $L_k$ represents a multipath number from candidate cell k, wherein the $L_k$ taps are obtained by shifting a FFT window by a constant delay of $\tau^*$, and wherein the one or more signal metrics includes the sum;
   utilizing a threshold value to determine $L_k$ where a $L_k$ value is unknown and more than a tap is detected;
   refining identification of candidate cells by incoherently combining multiple observations over time and space in different channels, wherein $L_k$ taps with the largest sum tap-values are selected prior to combining signal metrics over different obervations as ascertained by the squared FFT that correspond to the dot-product for each of the signals with the SSC sequence associated with one of the candidate cells k;
   comparing corresponding signal metrics associated with each of the candidate cells k in order to identify a cell exhibiting maximum signal metrics situated within one of the candidate cells k as the closest detected cell; and
   employing a location of the closest detected cell to infer a position of an access terminal.

2. A wireless communications apparatus, comprising:
   a memory that retains instructions related to:
      receiving signals from a plurality of cells wherein the signals include secondary synchronization channel (SSC) sequences,
      identifying candidate cells k based at least in part on the received signals,
      selecting one or more signal metrics associated with each of the candidate cells k,
      determining a dot-product for each of the received signals with the SSC sequences $S_k$ for each of the candidate cells k,
      determining a fast Fourier transform (FFT) of the dot-product for each of the received signals with the SSC sequences $S_k$ for each of the candidate cells k,
      squaring the FFT of the dot-product for each of the received signals with the SSC sequences $S_k$ of the candidate cells k,
      determining a sum of $L_k$ taps based on the squared FFT for each of the candidate cells k, wherein $L_k$ represents a multipath number from candidate cell k, wherein the $L_k$ taps are obtained by shifting a FFT window by a constant delay of $\tau^*$, and wherein the one or more signal metrics includes the sum,
      utilizing a threshold value to determine $L_k$ where a $L_k$ value is unknown and more than a tap is detected,
      refining identification of candidate cells by incoherently combining multiple observations over time and space in different channels, wherein $L_k$ taps with a largest sum tap-values are selected prior to combining signal metrics over different obervations as ascertained by the squared FFT that correspond to the dot-product for each of the signals with the SSC sequence associated with one of the candidate cells k;
      comparing corresponding signal metrics associated with each of the candidate cells k in order to identify a cell exhibiting maximum signal metrics situated within one of the candidate cells k as the closest detected cell, and
      employing a location of the closest detected cell to infer a position of an access terminal; and
   a processor, coupled to the memory, configured to execute the instructions retained in the memory.

3. A wireless communications apparatus that effectuates detection of a cell in a wireless communication environment, comprising:
   means for receiving signals from multiple cells and identifying candidate cells k based at least in part on the received signals, wherein the signals from multiple cells include a secondary synchronization channel (SSC) sequence $S_k$ for each of the multiple cells;
   means for selecting signal metrics associated with each of the candidate cells k;
   means for determining a dot-product for each of the received signals with the SSC sequences $S_k$ for each of the candidate cells k;

means for determining a fast Fourier transform (FFT) of the dot-product for each of the received signals with the SSC sequences $S_k$ of the candidate cells k;

means for squaring the FFT of the dot-product for each of the received signals with the SSC sequences $S_k$ of the candidate cells k;

means for determining a sum of $L_k$ taps based on the squared FFT for each of the candidate cells k, wherein $L_k$ represents a multipath number from candidate cell k, wherein the $L_k$ ta$_p$s are obtained by shifting a FFT window by a constant delay of $\tau^*$, and wherein the signal metrics include the sum;

means for utilizing a threshold value to determine $L_k$ where a $L_k$ value is unknown and more than a tap is detected;

means for refining identification of candidate cells by incoherently combining multiple observations over time and space in different channels, wherein $L_k$ taps with the largest sum tap-values are selected prior to combining signal metrics over different obervations as ascertained by the squared FFT that correspond to the dot-product for each of the signals with the SSC sequence associated with one of the candidate cells k;

means for comparing signal metrics to identify a cell exhibiting maximum signal metrics located within one of the candidate cells k as the closest detected cell; and means for employing a location of the closest detected cell to infer a position of an access terminal.

4. A non-transitory computer-readable memdium, comprising:

code for receiving signals from multiple cells and identifying candidate cells k based at least in part on the received signals, wherein the signals from multiple cells include a secondary synchronization channel (SSC) sequence $S_k$ for each of the multiple cells;

code for selecting signal metrics associated with each of the candidate cells k;

code for determining a dot-product for each of the received signals with the SSC sequences $S_k$ for each of the candidate cells k;

code for determining a fast Fourier transform (FFT) of the dot-product for each of the received signals with the SSC sequences $S_k$ of the candidate cells k;

code for squaring the FFT of the dot-product for each of the received signals with the SSC sequences $S_k$ of the candidate cells k;

code for determining a sum of $L_k$ taps based on the squared FFT for each of the candidate cells k, wherein $L_k$ represents a multipath number from candidate cell k, wherein the $L_k$ ta$_p$s are obtained by shifting a FFT window by a constant delay of $\tau^*$, and wherein the signal metrics include the sum;

code for utilizing a threshold value to determine $L_k$ where a $L_k$ value is unknown and more than a tap is detected;

code for refining identification of candidate cells by incoherently combining multiple observations over time and space in different channels, wherein $L_k$ taps with the largest sum tap-values are selected prior to combining signal metrics over different obervations as ascertained by the squared FFT that correspond to the dot-product for each of the signals with the SSC sequence associated with one of the candidate cells k;

code for comparing signal metrics to identify a cell exhibiting maximum signal metrics located within one of the candidate cells k as the closest detected cell; and code for employing a location of the closest detected cell to infer a position of an access terminal.

5. A wireless communications apparatus, comprising:
a processor configured to:

receive signals from multiple cells and identifying candidate cells k based at least in part on the received signals, wherein the signals from multiple cells include a secondary synchronization channel (SSC) sequence $S_k$ for each of the multiple of cells;

select signal metrics associated with each of the candidate cells; determine a dot-product for each of the received signals with the SSC sequences $S_k$ for each of the candidate cells k;

determine a fast Fourier transform (FFT) of the dot-product for each of the received signals with the SSC sequences $S_k$ of the candidate cells k;

square the FFT of the dot-product for each of the received signals with the SSC sequences $S_k$ of the candidate cells k;

determine a sum of $L_k$ taps based on the squared FFT for each of the candidate cells k, wherein $L_k$ represents a multipath number from candidate cell k, wherein the $L_k$ taps are obtained by shifting a FFT window by a constant delay of $\tau^*$, and wherein the one or more signal metrics includes the sum;

utilize a threshold value to determine $L_k$ where a $L_k$ value is unknown and more than a tap is detected;

refine identification of candidate cells by incoherently combining multiple observations over time and space in different channels, wherein $L_k$ taps with the largest sum tap-values are selected prior to combining signal metrics over different obervations as ascertained by the squared FFT that correspond to the dot-product for each of the signals with the SSC sequence associated with one of the candidate cells k;

compare signal metrics to identify a cell exhibiting maximum signal metrics located within one of the candidate cells k as the closest detected cell; and employ a location of the closest detected cell to infer a position of an access terminal.

6. The wireless communications apparatus of claim 5, wherein the processor is further configured to receive location information from a serving base station or second base station located in a disparate candidate cell.

7. The wireless communications apparatus of claim 6, wherein the serving base station or the second base station located in the disparate candidate cell interchange location information with one another.

8. The wireless communications apparatus of claim 6, wherein the serving base station dispatches location information associated with the second base station to the wireless communications apparatus, the location information associated with the second base station employed by the wireless communications apparatus in preference to location information associated with the serving base station.

9. The wireless communications apparatus of claim 5, wherein the processor is further configured to send location information to a serving base station or second base station situated in a disparate candidate cell.

10. The wireless communications apparatus of claim 9, wherein the processor is further configured to indicate to the serving base station or the second base station that the location information associated with the second base station is to be associated with the wireless communications apparatus in preference to the location information associated with the serving base station.

* * * * *